United States Patent
Uehara et al.

(10) Patent No.: US 7,388,891 B2
(45) Date of Patent: Jun. 17, 2008

(54) WIDE BANDWIDTH LIGHT SOURCE

(75) Inventors: Noboru Uehara, Aichi (JP); Yuichi Takushima, Tokyo (JP); Kentaro Yasunaka, Kanagawa (JP)

(73) Assignee: Santec Corporation, Aichi (JP)

( * ) Notice: Subject to any disclaimer, the term of this patent is extended or adjusted under 35 U.S.C. 154(b) by 372 days.

(21) Appl. No.: 11/075,425

(22) Filed: Mar. 9, 2005

(65) Prior Publication Data
US 2005/0201432 A1 Sep. 15, 2005

(30) Foreign Application Priority Data
Mar. 10, 2004 (JP) ............................. 2004-067750
Feb. 8, 2005 (JP) ............................. 2005-032132

(51) Int. Cl.
*H01S 3/13* (2006.01)
(52) U.S. Cl. .................... 372/30; 372/29.01; 372/29.02
(58) Field of Classification Search ................. 372/30, 372/29.01, 29.02
See application file for complete search history.

(56) References Cited
U.S. PATENT DOCUMENTS
2002/0044574 A1*  4/2002  Abedin ...................... 372/18
2004/0175082 A1*  9/2004  Birks et al. ................. 385/123
2005/0163170 A1*  7/2005  Okhotnikov et al. .......... 372/6

* cited by examiner

*Primary Examiner*—Dung T Nguyen
(74) *Attorney, Agent, or Firm*—Cheng Law Group PLLC

(57) ABSTRACT

PROBLEM TO BE SOLVED: to realize a wide bandwidth light source capable of a stable operation providing a less spectrum variation.

SOLUTION: Optical pulses 202 outputted by this optical pulse-generating device 201 are split by optical coupler 210. The one of split optical pulses is inputted in white light-emitting device 204 to emit the white light having the wide bandwidth. The other split is inputted in optical band pass filter 212 in operation-stabilizing circuit 207. Optical detector 213 detects a signal level of a specific wavelength and input in feedback circuit 215 to generate first and second feedback signals 205 and 206. Ring resonator fiber laser 208 uses any one of them and controls a rotation angle of the waveplate to realize stabilization of the output.

20 Claims, 33 Drawing Sheets

A wide bandwidth light source in the first example

PRIOR ART

Wide-bandwidth light source conventionally proposed

An optical pulse-generating device (noise-like laser) of the wide bandwidth light source An output pulse train outputted by conventional optical pulse-generating device A spectrum of an optical pulse outputted by conventional optical pulse-generating device The spectrum of the wide bandwidth light source conventionally proposed A wide bandwidth light source in the first example An optical pulse-generating device (noise-like laser) in the first example The spectrum of the noise-like laser in the first example The dependency of an optical signal strength at 1450nm wavelength to the rotation angle of the first λ/4 waveplate in the first example The spectrum of the noise-like laser in the first example The dependency of an optical signal strength at 1450nm wavelength to the rotation angle of the first $\lambda/2$ waveplate in the first example The spectrum of the noise-like laser in the first modified example The dependency of an optical signal strength at 1540nm wavelength to the power of the pump light diode in the first modified example An optical pulse-generating device (noise-like laser) in the second modified example A wide bandwidth light source in the second example The spectrum of the wide bandwidth light source in the second example The dependency of an optical signal strength at 1140nm wavelength to the rotation angle of the first λ/4 waveplate in the second example The spectrum of the wide bandwidth light source in the second example The dependency of an optical signal strength at 1140nm wavelength to the rotation angle of the first $\lambda/2$ waveplate in the second example A wide bandwidth light source in the third example The spectrum of the wide bandwidth light source in the third example The dependency of an optical signal strength at 1350nm wavelength to the power of the pump light diode in the third example A wide bandwidth light source in the fourth example A wide bandwidth light source in the fifth example

WIDE BANDWIDTH LIGHT SOURCE

FIELD OF THE INVENTION

The present invention relates, that is exemplified by optical diagnosis employed in medical treatment and evaluation of a tomographic imaging apparatus or an optical communication component using optical interference, to a wide bandwidth light source necessary for fields particularly requiring the wide bandwidth light source and an operation method for such the wide bandwidth light source.

BACKGROUND OF THE INVENTION

One of fields expected for application of a wide bandwidth light source is clinical medicine. Conventionally, for finding early diseases such as a cancer, it has been widely carried out to obtain a tomographic image of a specific site of a human body by using a variety of approaches such as X-ray, sonic wave, or MRI (Magnetic Resonance Imaging tomography.) Such the tomographic image with higher resolution makes higher or more reliable pathologic diagnosis possible. Thus, as exemplified by OCT (Optical Coherence Tomography,) development has been continuing for obtaining the image with high spatial resolution, enabling to distinguish each cell. For this purpose, a broadband light source is desired in order to radiate light, which is emitted from an interferometer to a tissue.

Typical approaches for obtaining the wide bandwidth light source include the following examples.
(1) Approach by using an active gain medium such as a laser medium.
(2) Approach by using nonlinear effects Of these two approaches, the approach using the active gain medium such as a laser medium to increase in the gain is described as follows. In this approach, the wide bandwidth light source is realized by amplifying the spontaneous emission light (ASE: a noun expressing a sense opposite to stimulated emission light). Such the wide bandwidth light source includes an optical fiber (EDFA: Er-doped fiber amplification, etc.) doped with rare earths ions, for example, Er (erbium,) Tm (thulium,) Pr (praseodymium,) and the like (refer to patent document 1.) According to patent document 1, a pump light having different wavelengths or light intensities is coupled to each of both ends or near places around the both ends of the Er-doped optical fiber. Then, the spontaneous emission light, which is emitted by absorption of the pump light in a rare earth ions contained in a core of rare earth-doped fiber, is used as an output of the wide bandwidth light source.

Next, (2) Approach by using the nonlinear effect is described as follows. As will be described below, this approach utilizes nonlinear effects in fibers such as. super-continuum(SC) generation, optical solitons, and so on. The super-continuum light source generates the light with an ultra-wide bandwidth by launching a high intensity light pulse into the third-order nonlinear medium. In addition, it has been proposed to make an optical soliton pulse as the wide bandwidth white light by using adiabatic pulse compression device composed of an anomalous dispersion optical fiber and the white light-emitting device, which is composed of a normal dispersion optical fiber and used for expanding a spectral width (refer to patent document 2.) According to this proposal, the light pulse, which is outputted from a light pulse source, is amplified up to a peak intensity, in which an optical soliton of the first-order is made at the emission end of a adiabatic pulse compressor, by using a light amplifier. Subsequently, by using the adiabatic pulse compressor, as the optical fiber, in which an anomalous dispersion value decreases from an incident end to the emission end, the optical soliton is subjected to adiabatic compression. The optical soliton compressed in such the way is properly amplified by another light amplifier. Then, a spectral width is expanded by using the white light emitter to emit as the white light having a high coherence and the wide bandwidth. In this way, a coherent light source is obtained providing the wide bandwidth of 225 nm of which wavelengths range from 1.45 µm to 1.68 µm.

For the optical coherence tomography as described first, a proposal has been made to measure information contained in a living body tissue by using a superluminescent diode (SLD) as the light source through optical coherence (interference fringe) (refer to non-patent document 1, for example.) The SLD light source has short temporal coherence and high spatial coherence unlike a laser sources. Where, the temporal coherence is defined as the correlation or predictable relationship of phase between optical waves observed at different moments in time. The spatial coherence is defined as the correlation of phase between optical waves at different points in space. In the case of the superluminescent diode (SLD) light source having 16 nm of the spectral width, the spatial resolution ranges from 10 to 20 µm. The spectral width is in the inverse proportion to the spatial resolution. Therefore, in order to obtain a high spatial resolution, the spectral width should be expanded.

There are the following problems in the conventional approaches as described above.
(1) The case of the wide bandwidth light source using active ions of rare earths arises a problem in that the bandwidth of the wide bandwidth light source is limited to a gain spectrum bandwidth of the active ions.
(2) The case of the wide bandwidth light source using the optical soliton pulse arises a problem in that (a) modulation instability is present (side-band instability.) In addition, there is the problem of (b) nonlinearity and dispersion controls are difficult. Particularly, to solve the latter (b) problem, dispersion should be closed to zero as possible to produce short pulses. However, there arises the following problem in this way: stable manufacture is difficultly realized and, also, reproducibility becomes difficult.

Therefore, the proposal is made for the light source providing a strong optical signal and a very wide bandwidth in comparison with these conventional techniques. According to this proposal, the laser light source called a noise-like laser is used as an optical pulse-generating device. Moreover, accompanied with this, a highly nonlinear optical fiber such as a Ge(germanium) doped Silica based optical fiber and a photonic crystal fiber is used as device for generating the white pulses as a wide bandwidth light. The noise-like laser is described below. The wide bandwidth light source according to this proposal has an optical signal spectrum with excellent flatness of light intensity ranging from 1.2 µm to 2.0 µm wavelengths. Thus, using this wide bandwidth light source enables to perform loss evaluation of a wide range of optical components, which includes that used for optical access systems, for the range of wavelengths between 1.2 µm and 1.65 µm. In addition, use of the wide bandwidth light source as the light source for OCT makes possible very excellent precision analysis carried out in some micrometers or shorter spatial resolution.

FIG. 1 shows an example of a conventionally proposed wide bandwidth light source using the laser light source called the noise-like laser. Wide bandwidth light source 100 is constituted by optical pulse-generating device 102 comprising ring resonator fiber laser 101 and white light-emitting device 104 for inputting optical pulse 103 outputted from this optical pulse-generating device 102. White light-emitting device 104 is constituted by HNL (highly nonlinear) fiber 105. Where, in HNL fiber 105, a dispersion value is −0.60 ps$^2$/km per 1550 nm, zero dispersion wavelength is 1532 nm, dispersion slope is −0.0366 ps$^2$/km/nm, nonlinear constant is 20/W/km, loss is 1.59 dB per 1550 nm, and length of fiber is 1 km. Optical pulse-generating device 102 is connected to optical pulse-emitting device 104 by using single mode optical fiber 106.

FIG. 2 shows a configuration of the optical pulse-generating device according to this proposal. Optical pulse-generating device 102 has ring resonator fiber laser 101. In ring resonator fiber laser 101, one end of each of a first and second single mode optical fiber (SMF) 113 and 114 made of Corning Incorporated. (USA)-made Flexcore(product name is "Flexcore 1060") is connected to each of one end of a first and a second dispersion shift fibers (DSF) 111 and 112 having 1.8 m each the length and Er-doped optical fiber (EDF) 115 having 2.5 m length is connected to the other ends of the above fibers. To Er-doped optical fiber (EDF) 115 is connected WDM (wavelength division multiplexing) coupler 118 for inputting pump light 117 of 1480 nm wavelength from laser diode (LD) 116 as pump light source for pumping.

On each other side of first and second dispersion shift fibers 111 and 112, a first or a second collimate lenses 121 and 122 are arranged to convert the light to be propagated to a spatial parallel beam. In space portions opposite to these first and second collimate lenses 121 and 122, first λ/4 waveplate 123, the λ/2 waveplate 124, polarizing beam splitter (PBS) 125, optical isolator (ISO) 126, and second λ/4 waveplate 127 are arranged serially starting from the first collimate lens 121. The laser light split by polarizing beam splitter 125 is coupled to output optical fiber 129 by using output coupling collimate lens 128 to be sent to an output port not illustrated. The total length of ring resonator fiber laser 101 is 14 m and a longitudinal mode interval of the optical resonator is 14.3 MHz.

In this conventional optical pulse-generating device 102, optical fiber 106 is used for ring resonator fiber laser 101. Optical isolator 126 propagates a light wave traveling in the right direction and blocks the light wave traveling in the opposite direction in FIG. 2. Therefore, the light pulse circulates clockwise around inside of the ring resonator. The output light thereof is partially extracted from the output port by an output coupler constituted by λ/2 waveplate 124 and polarizing beam splitter 125, rotating λ/2 waveplate 124 causes rotation of a plane of polarization. On the other hand, polarizing beam splitter 125 has characteristics in that a horizontally polarized light travels straight and a vertically polarized light is reflected on a 45 deg plane. Using these characteristics allows an output ratio of the output coupler to be variably regulated in the range between 0 and 100 percents.

Meanwhile, first λ/4 waveplate 123 is used for adjustment of the polarization state, which is normally elliptic polarization, of the light wave inputted from first dispersion shift fiber 111 to a desired polarization state. Second λ/4 waveplate 127 is used for adjustment of the polarization state, which is linear polarization, of the light wave inputted passing through optical isolator 126 to make it coincide with an inherent polarization mode state of an optical fiber path.

FIG. 3 shows a temporal waveform of an output pulse train outputted by this conventional optical pulse-generating device. Optical pulse 103 (FIG. 1) outputted by optical pulse-generating device 102 illustrated in FIG. 1 or FIG. 2 makes a pulse train generated in a predetermined time interval. The time interval of optical pulse 103 is 70 ns nanoseconds: 10$^{-9}$ seconds) and the cyclic frequency is 14.3 MHz.

FIG. 4 shows an example of a spectrum of the optical pulse outputted by the conventional optical pulse-generating device. A full width at half maximum of the spectrum of optical pulse 103 is 87 nm.

FIG. 5 shows a change of the spectrum with an average output power of the optical pulse-generating device and the length of the single mode optical fiber. The same fig (a) coincides with the spectrum of the optical pulse shown in FIG. 4. In FIG. 5, the combination of the average output power (mW) of optical pulse-generating device 102 (FIG. 1) with the length (m) of the single mode optical fiber 106, in which optical pulse-generating device 102 shown in FIG. 1 is connected to optical pulse-emitting device 104, is changed. From these figures, it can be known that the optical pulse with a relatively narrow bandwidth as shown in the same figure (a) changes to the optical pulse with a relatively wide bandwidth as shown in the same figure (e.)

As described above, realizing wide bandwidth light source 100, shown in FIG. 1, by using the noise-like laser enables to realize the wide bandwidth light source having a flat and preferable spectrum characteristic in comparison with the conventional wide bandwidth light source. For example, optical pulse 103*e* as shown in the same figure (e) realizes, in the case where an average input power is 72 mW, the flat and preferable spectrum characteristic having a bandwidth of 800 or more nm in the range between 1200 nm wavelength and 2000 nm wavelength.

Patent document 1: Japanese Published Unexamined Patent Application No. 2003-347630 (paragraph No. 0011, FIG. 1)

Patent document 2: Japanese Published Unexamined Patent Application No. H11-160744 (paragraph No. 0037, FIG. 3)

Non-patent document 1: Optronics Monthly (July 2003, p. 219)

However, the wide bandwidth light source according to the present proposal uses passive mode-locking. Therefore, when vibration and a temperature change occur in outside of the wide bandwidth light source, a signal spectrum and an output light amount vary sensitively and, thus, mode-locking is not stably reproduced. Hence, in the worst case, mode-locking is not maintained. Moreover, in the noise-like laser as the optical pulse-generating device at the start of the operation, a light ray propagation path thereof is partially constituted by the optical fiber. Therefore, when a temperature as an external environmental factor changes, a thermal stress of the optical fiber constituting the noise-like laser changes. As the result, an internal polarization state of the optical fiber is changed by the stress and a temperature status of the optical fiber at different times. Consequently, a very small birefringent amount of inside of the optical fiber changes and, then, the inherent polarization mode state for internal propagation is broken. From these causes, there is a problem in that mode-locking is difficult to operate in the wide bandwidth light source according to the present proposal.

When stable operation is not performed, output stability of the wide bandwidth light source according to the present proposal is 1 or more dB in the case where measurement is carried out for 1 hour. For use as the light source for loss evaluation of optical components, output stability should be 0.3 or less dB and preferably 0.1 or less dB. Therefore, a stable operation method providing a less spectrum variation should be found. Also for external factorial changes such as temperature change, a stable operation mechanism to maintain the polarization mode state of the optical fiber and keep optical output strength stable is absolutely necessary.

SUMMARY OF THE INVENTION

The object of the present invention is to provide the wide bandwidth light source capable of carrying out the stable operation occurring the less spectrum variation.

According to the present invention, a wide bandwidth light source comprises (a) optical pulse-generating means for generating pulses of light; (b) white light-emitting means for emitting a white light, of which spectrum distribution ranges to a wide bandwidth, by inputting pulses of light outputted from this optical pulse generating means; (c) monitoring means for monitoring a light component of a predetermined wavelength yielded by splitting the pulses of light outputted by the optical pulse generating means or the white light outputted by the white light emitting means; (d) operation-stabilizing means for controlling an output from the optical pulse generating means in the range, in which mode-locking is maintained, by using a result of monitoring by this monitoring means.

According to the present invention, on the basis of the result of monitoring, the operation-stabilizing means is installed for controlling the output from the optical pulse generating means in the range, in which mode-locking is maintained, and, thus, the output stability of the wide bandwidth light source is improved and a wide range of usage such as loss evaluation of optical components becomes possible.

According to the present invention, the wide bandwidth light source comprises (a) the optical pulse-generating means comprising a ring resonator fiber laser, having a $\lambda/4$ waveplate and a $\lambda/2$ waveplate in a light path thereof, and outputting after splitting the optical pulses, that is passed through these 2 waveplates, by using a polarizing beam splitter; (b) the rotation stage on which at least one of the $\lambda/4$ waveplate and the $\lambda/2$ waveplate are individually rotatably arranged; (c) splitting means for splitting light of the optical pulses, that is outputted by the optical pulse-generating means, in a predetermined proportion; (d) a filter for selecting the light components of the specific wavelength by inputting the light split by the splitting means; (e) photoelectric converting means for converting the light components of the specific wavelength, that is selected by this filter, to an electric signal; and (f) the operation-stabilizing means for feeding the electric signal outputted by this photoelectric converting means to the rotation stage as a feedback signal in order to control the rotation angle for operation of output control of the optical pulse-generating means in the range, in which mode-locking is maintained.

According to the present invention, the optical pulse, which is outputted from the optical pulse-generating means comprising the ring resonator fiber laser, is partially extracted through splitting by the splitting means to be converted to the electric signal by selecting light components of a specific wavelength using the filter. On the basis of this electric signal, the feedback signal is produced to feed to the rotation stage rotating the $\lambda/4$ waveplate or the $\lambda/2$ waveplate, which comprises the ring resonator fiber laser, for operation of output control of the optical pulse-generating means in the range, in which mode-locking is maintained.

According to the present invention, the wide bandwidth light source comprises (a) the optical pulse-generating means comprising a ring resonator fiber laser, having a $\lambda/4$ waveplate and a $\lambda/2$ waveplate in a light path thereof, and outputting after splitting the optical pulses, that is passed through these 2 waveplates, by using a polarizing beam splitter; (b) the rotation stage on which at least one of the $\lambda/4$ waveplate and the $\lambda/2$ waveplate are individually rotatably arranged; (c) white light-emitting means for emitting white light, of which spectrum distribution extends to the wide bandwidth, by inputting the optical pulses outputted by the optical pulse-generating means; (d) splitting means for splitting light of white light, that is outputted by the white light-emitting means as a light source, in the predetermined proportion; (e) a filter for selecting the light components of the specific wavelength by inputting the light split by the splitting means; (f) photoelectric converting means for converting the light components of the specific wavelength, that is selected by this filter, to an electric signal; and (g) the operation-stabilizing means for feeding the electric signal outputted by this photoelectric converting means to the rotation stage as a feedback signal in order to control the rotation angle for operation of output control of the optical pulse-generating means in the range, in which mode-locking is maintained.

According to the present invention, the white light-emitting means is arranged following the optical pulse-generating means to emit white light of which spectrum extends to the wide bandwidth.

According to the present invention, the wide bandwidth light source comprises (a) the optical pulse-generating means comprising a ring resonator fiber laser, having a $\lambda/4$ waveplate and a $\lambda/2$ waveplate in a light path thereof, and outputting after splitting the optical pulses, that is passed through these 2 waveplates, by using a polarizing beam splitter; (b) the rotation stage on which at least one of the $\lambda/4$ waveplate and the $\lambda/2$ waveplate are individually rotatably arranged; (c) splitting means for splitting light of the optical pulses, that is outputted by the optical pulse-generating means, in a predetermined proportion; (d) a first filter for passing light components of the first wavelength and reflecting other wavelength components by inputting the light split by the splitting means; (e) first photoelectric converting means for converting the light components of the first wavelength, that is passed through this first filter, to the electric signal; (f) a second filter for passing light components of a second wavelength, that is different form the first wavelength, and reflecting other wavelength components by inputting the light components reflected by the first filter; (g) a second photoelectric converting means for converting the light components of the second wavelength, that is passed through this second filter, to the electric signal; (h) a selection circuit for selecting any one of electric signals outputted by these first and the second photoelectric converting means; and (i) the operation-stabilizing means for feeding the electric signal outputted by this selection circuit to the rotation stage as a feedback signal in order to control the rotation angle for operation of output control of the optical pulse-generating means in the range, in which mode-locking is maintained.

According to the present invention, the optical pulse, which is outputted from the optical pulse-generating means comprising the ring resonator fiber laser, is partially extracted through splitting by the splitting means to be converted to the electric signal by selecting light components of each of different first and second wavelengths using the first and second filters. On the basis of any one of these 2 species of electric signals, the feedback signal is produced to feed to the rotation stage rotating the λ/4 waveplate or the λ/2 waveplate, which comprises the ring resonator fiber laser, for operation of output control of the optical pulse-generating means in the range, in which mode-locking is maintained.

According to the present invention, the wide bandwidth light source comprises (a) the optical pulse-generating means comprising a ring resonator fiber laser, having a λ/4 waveplate and a λ/2 waveplate in a light path thereof, and outputting after splitting the optical pulses, that is passed through these 2 waveplates, by using a polarizing beam splitter; (b) the rotation stage on which at least one of the λ/4 waveplate and the λ/2 waveplate are individually rotatably arranged; (c) white light-emitting means for emitting white light, of which spectrum distribution extends to the wide bandwidth, by inputting the optical pulses outputted by the optical pulse-generating means; (d) splitting means for splitting light of white light, that is outputted by the white light-emitting means as a light source, in the predetermined proportion; (e) the first filter for passing the light components of the first wavelength and reflecting other light components by inputting the white light split by the splitting means; (f) first photoelectric converting means for converting the light components of the first wavelength, that is passed through the first filter, to the electric signal; (g) the second filter for passing light components of a second wavelength, that is different form the first wavelength, and reflecting other wavelength components by inputting the light components reflected by the first filter; (h) a second photoelectric converting means for converting the light components of the second wavelength, that is passed through this second filter, to the electric signal; (i) a selection circuit for selecting any one of electric signals outputted by these first and second photoelectric converting means; and (j) the operation-stabilizing means for feeding the electric signal outputted by this selection circuit to the rotation stage as a feedback signal in order to control the rotation angle for operation of output control of the optical pulse-generating means in the range, in which mode-locking is maintained.

According to the present invention, the white light-emitting means is arranged following the optical pulse-generating means to emit white light of which spectrum extends to the wide bandwidth.

As described above, according to the present invention, transition an instable work of the wide bandwidth light source using the noise-like laser is inhibited by a simple configuration through monitoring the optical pulse, which is outputted by the optical pulse-generating means, or the white light, which is outputted by the white light-emitting means, to feedback to the optical pulse-generating means in order to realize the stable work the wide bandwidth light source. Hence, the present light source can be used as light source in various application fields by applying its excellent wide bandwidth characteristic.

DETAILED DESCRIPTION OF THE PREFERRED EMBODIMENTS

Embodiments of the present invention will be given below in detail by way of illustration.

EXAMPLE 1

Figure 6:
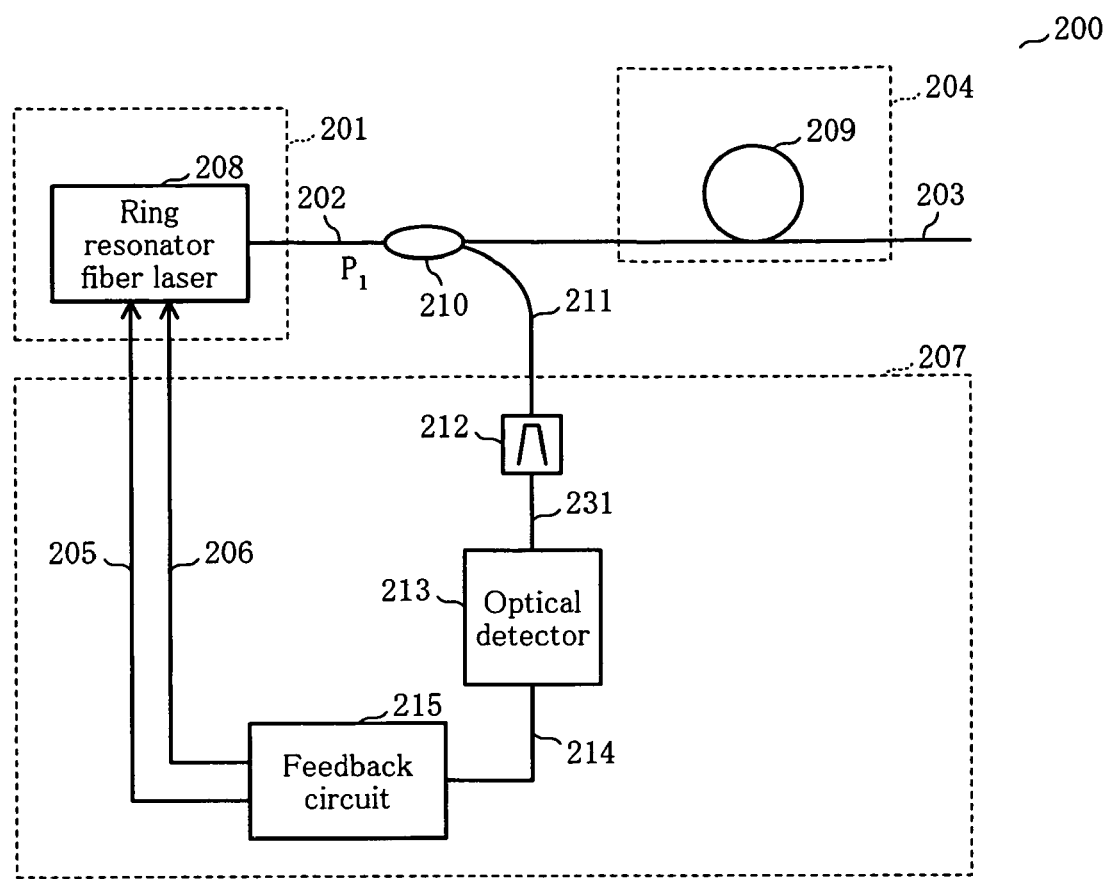
FIG. 6: The schematic block diagram showing the wide bandwidth light source in the first example according to the present invention.

FIG. 6 shows the wide bandwidth light source according to the 1st example of the present invention. This wide bandwidth light source 200 is constituted by optical pulse-generating device 201, white light-emitting device 204 for emitting white light 203 by inputting optical pulse 202 outputted by optical pulse-generating device 201, and operation-stabilizing circuit 207 for controlling optical pulse-generating device 201 by producing the first and second feedback signals 205 and 206 by inputting optical pulse 202. Where, optical pulse-generating device 201 has ring resonator fiber laser 208. White light-emitting device 204 is constituted by HNL (highly nonlinear) fiber 209. In operation-stabilizing circuit 207 is inputted partially optical pulse 202 by optical coupler 210 as the splitting device. Optical pulse 211, which has been split, for monitoring is inputted into optical band pass filter 212 in operation-stabilizing circuit 207. Through optical band pass filter 212, a specific wavelength λ1 is passed. Optical detector 213 detects a signal level of the passed light of the specific wavelength λ1. Detection output 214 of optical detector 213 is inputted in feedback circuit 215 to produce first and second feedback signals 205 and 206. Only any one of these first and second feedback signals 205 and 206 may be produced.

Figure 1:
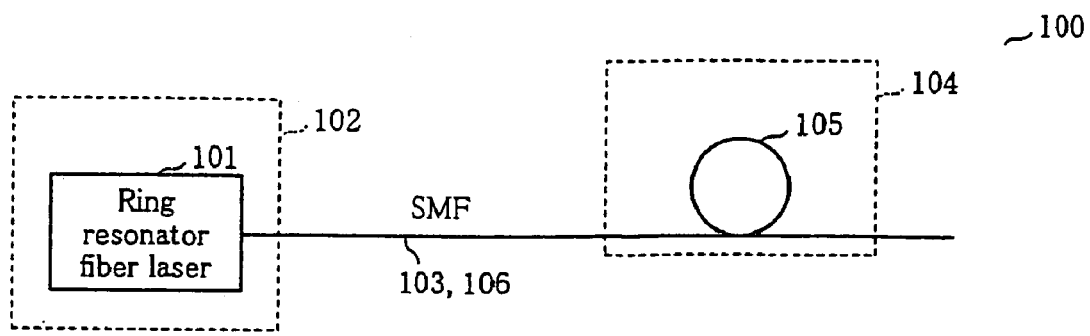
FIG. 1: a schematic block diagram showing an example of a wide bandwidth light source conventionally proposed.
Figure 2:
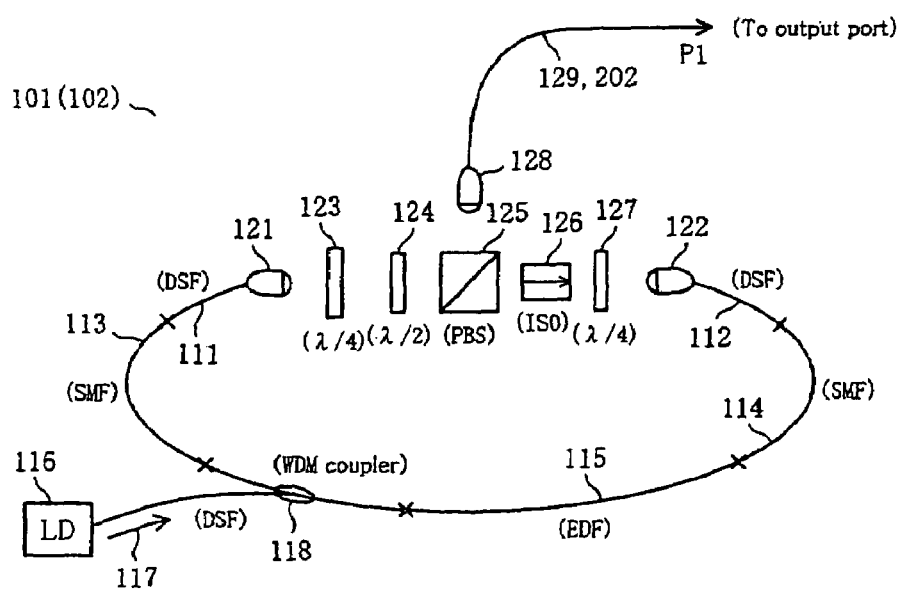
FIG. 2: the schematic block diagram showing a configuration of an optical pulse-generating device of the wide bandwidth light source of FIG. 1.
Figure 3:
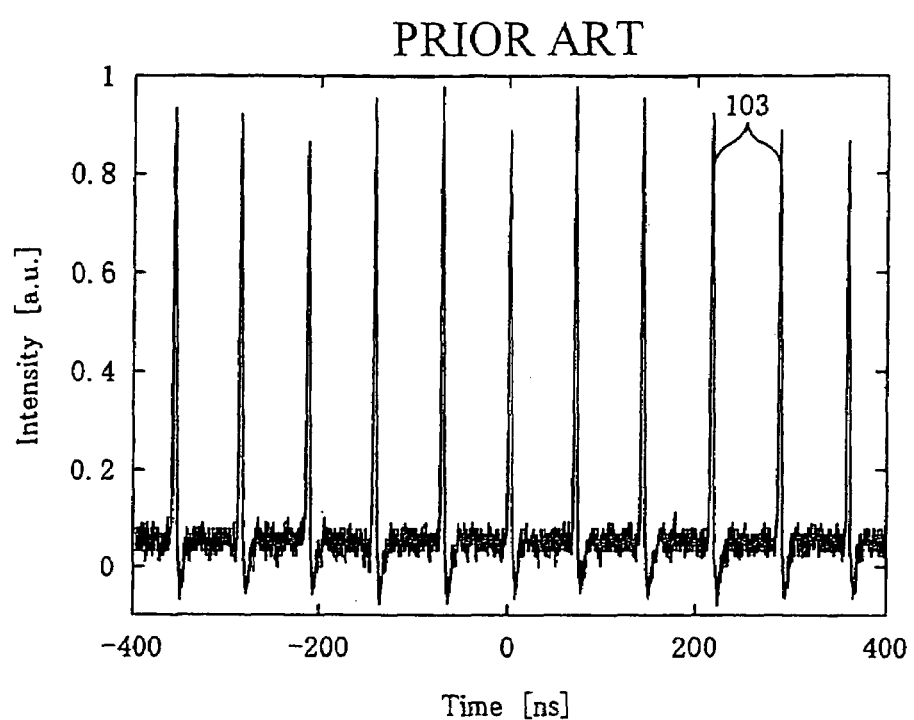
FIG. 3: a waveform pattern of an output pulse train outputted by a conventional optical pulse-generating device.
Figure 4:
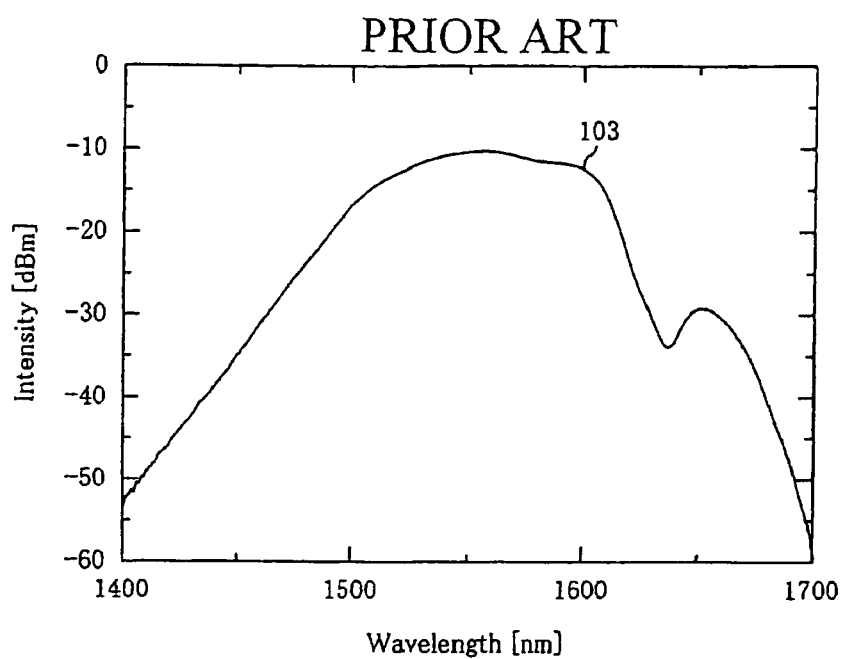
FIG. 4: a spectrum characteristic pattern of the output pulse train outputted by the conventional optical pulse-generating device.
Figure 5:
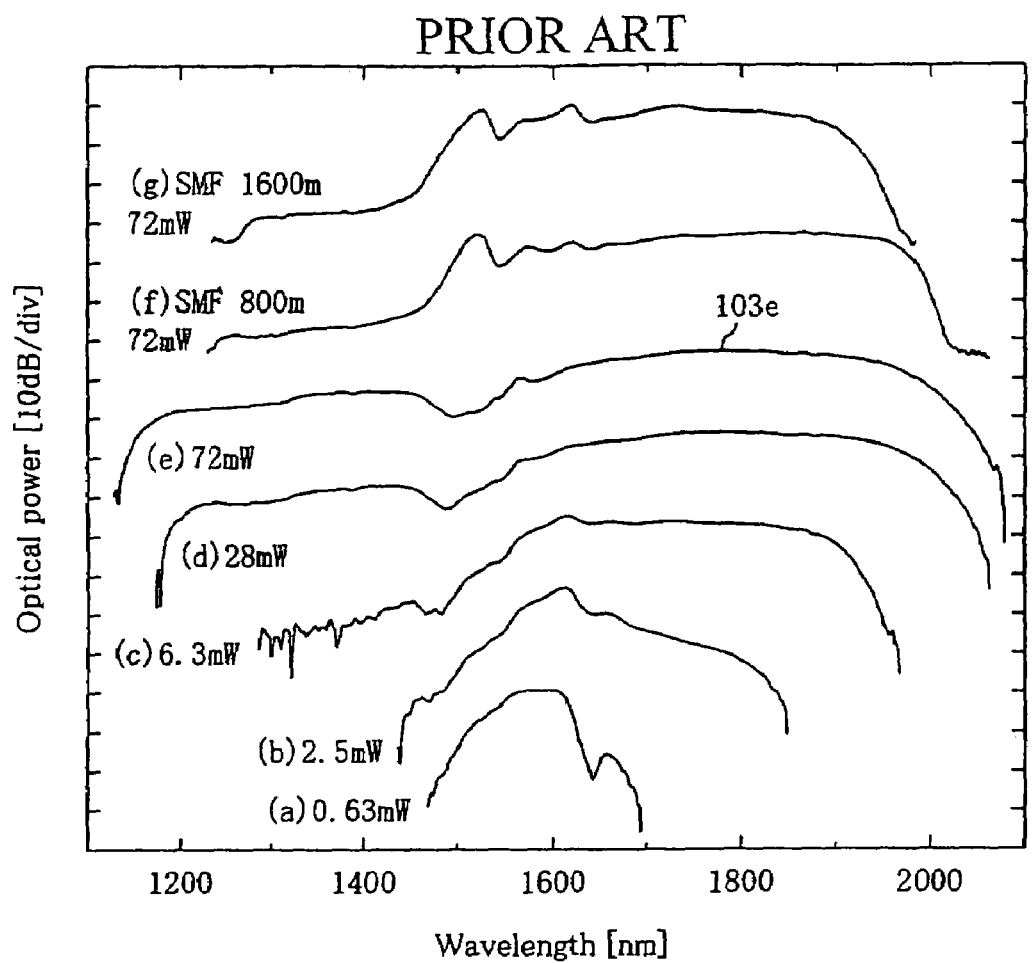
FIG. 5: The characteristic pattern expressing a spectrum change of the wide bandwidth light source to the output of the optical pulse-generating device and to a length of a single mode optical fiber.
Figure 7:
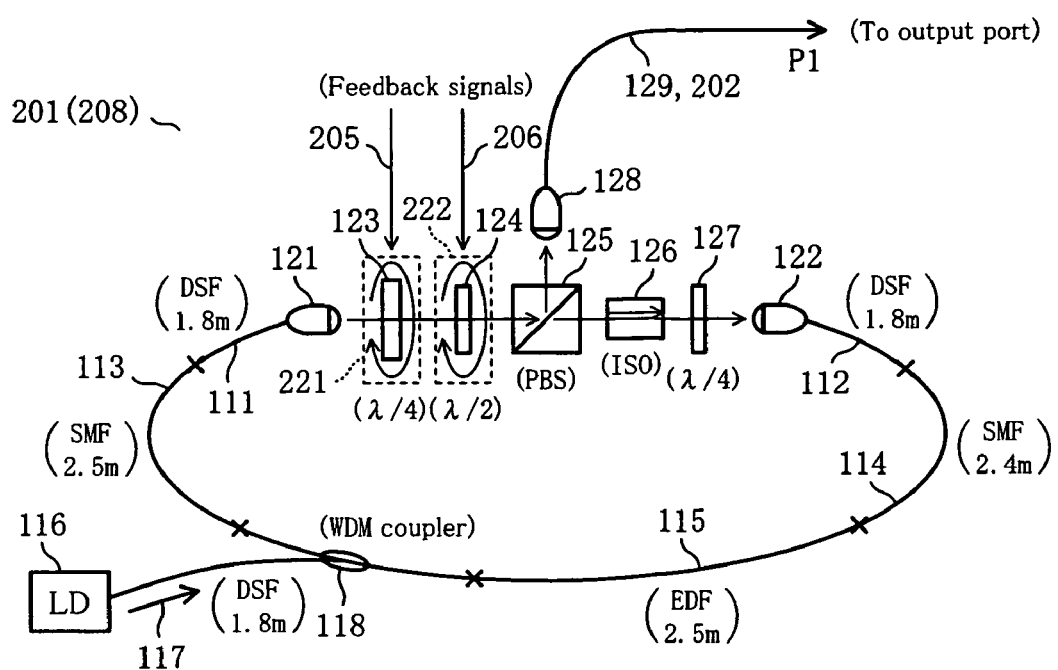
FIG. 7: The schematic block diagram showing the configuration of the optical pulse-generating device in the first example.

FIG. 7 expresses configuration of the optical pulse-generating device according to the present example. Optical pulse-generating device 201 is same as ring resonator fiber laser 101 shown in FIG. 2 in configuration except a part. Hence, a same reference numeral is attached to the same parts as those of FIG. 2 and, thus, description of these parts are omitted properly. Ring resonator fiber laser 208 is also called the noise-like laser. In ring resonator fiber laser 208, first λ/4 waveplate 123 is arranged on first automatic rotation stage 221. In first automatic rotation stage 221 is inputted first feedback signals 205 from feedback circuit 215 shown in FIG. 6. First automatic rotation stage 221 is rotated by first feedback signals 205 in an arbitrary angle in the range between 0 and 360 degrees to allow setting first λ/4 waveplate 123 in the arbitrary angle. λ/2 waveplate 124 is arranged on second automatic rotation stage 222. In second automatic rotation stage 222 is inputted second feedback signals 206 from feedback circuit 215 shown in FIG. 6. Second automatic rotation stage 222 is similarly rotated by second feedback signals 206 in the arbitrary angle in the range between 0 and 360 degrees to allow setting λ/2 waveplate 124 in the arbitrary angle. First automatic rotation stage 221 has a graduation indicating rotation angles. First λ/4 waveplate 123 is arranged in the arbitrary rotation position on first automatic rotation stage 221. Hence, the graduation of first automatic rotation stage 221 indicates simply a relative rotation amount of first λ/4 waveplate 123. A relation between angles of second automatic rotation stage 222 and λ/2 waveplate 124 is same as above.

The optical pulse 202, which is shown in FIG. 6, outputted by optical pulse-generating device 201 is split by optical coupler 210 in the proportion 1:9 of optical signal strength P1. Ten percents of the light having signal strength P1 is fed to operation-stabilizing circuit 207 as optical pulse 211 for monitoring. Optical band pass filter 212, in which this optical pulse 211 for monitoring is inputted, to be used is that in which its central wavelength λ1 is 1450 nm and the full width half maximum is 1 nm. Passed light component 231 of optical band pass filter 212 is inputted in optical detector 213 to be converted to the electric signal. Detected output 214 yielded in this way is inputted in feedback circuit 215.

In wide bandwidth light source 200 according to the present example, the wide bandwidth light source is stabilized for operation by controlling the rotation of first and second automatic rotation stages 221 and 222 through first and second feedback signals 205 and 206 produced by feedback circuit 215. To operate such the control, the work characteristics of the noise-like laser should be analyzed.

Figure 8:
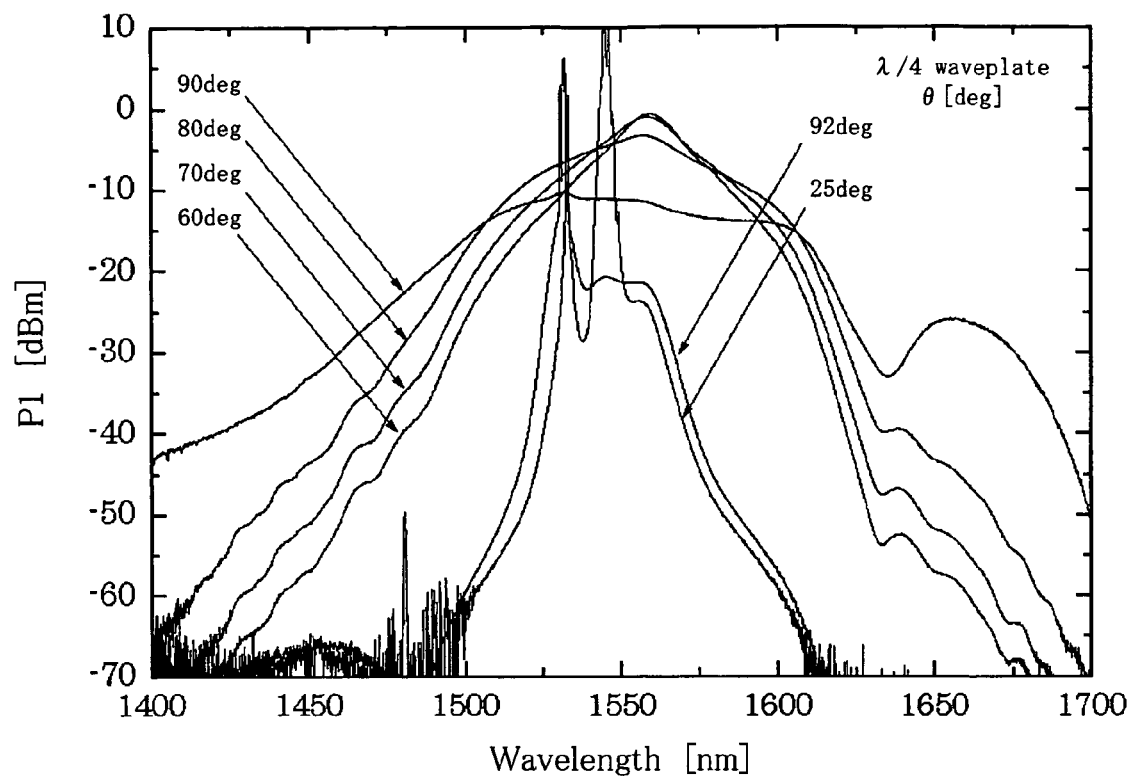
FIG. 8: a characteristic pattern of the spectrum characteristic of an outputted optical pulse to the rotation angle of a first λ/4 waveplate in the first example.

FIG. 8 shows the change of the light pulse as the noise-like laser outputted by the optical pulse-generating device by the rotation of the first λ/4 waveplate. The axis of ordinate represents optical signal strength P1 and the axis of abscissa represents the wavelength (nm.) The rotation angle shown in this figure expresses the graduation read of first automatic rotation stage 221 (FIG. 7.) In this example, the optical pulse becomes a wide bandwidth spectrum in 90 degrees of the rotation angle rather than other angles shown in this figure.

Figure 9:
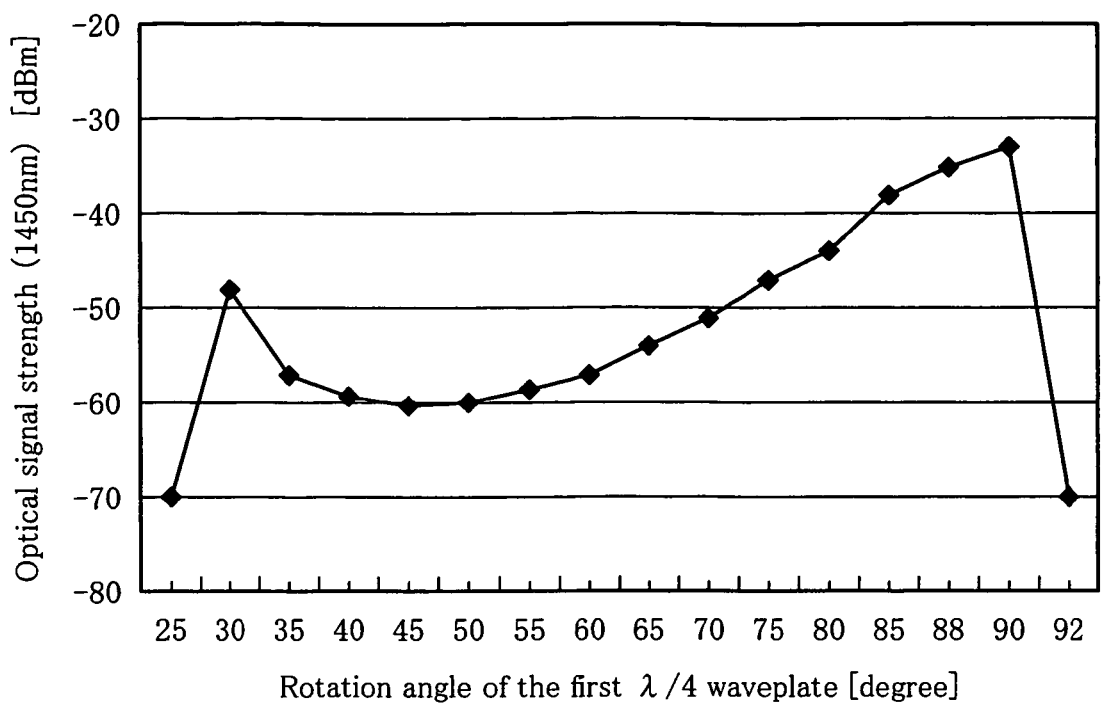
FIG. 9: the characteristic pattern of an optical signal strength at 1450 nm wavelength to the rotation angle of the first λ/4 waveplate in the first example.

FIG. 9 shows dependency of optical signal strength on the rotation angle of the first λ/4 waveplate, when the light of 1450 nm wavelength is used. When the rotation angle of first automatic rotation stage 221 is 25 degrees and 92 degrees, mode-locking is not maintained. The best wide bandwidth spectrum, in which mode-locking is operable, is obtained, in consideration combined with FIG. 8, in the case where the rotation angle is 90 degrees. However, as shown in FIG. 9, a range of angles, in which the stable operation is carried out in the angle around 90 degrees of the rotation angle, is narrow. In addition, when the rotation angle is 90 degrees, a behavior of the signal strength toward an increase and decrease in the rotation angle is asymmetric.

Thus, when rotation control is carried out for first λ/4 waveplate 123, the upper limit (the rotation angle 91 degrees) and the lower limit (the rotation angle 45 degrees) is made in the angle range, in which first automatic rotation stage 221 is rotated. In addition, an algorism is employed to increase gradually the initial rotation state from the lower limit. By using this algorism, monitoring Detected output 214 of optical detector 213 shown in FIG. 6, and using first feedback signal 205 to make always strength of a received signal constant as −35 dBm, feedback control of the rotation angle of first λ/4 waveplate 123 is carried out on first automatic rotation stage 221. In this way, it is known that stable work is realized in 0.3 dB output of wide bandwidth light source 200 according to the present example, when measurement is operated for 1 hour.

The above description is applied to the case where wide bandwidth light source 200 is stably worked by operating rotation control of first λ/4 waveplate 123 by using first feedback signals 205. It is possible to use λ/2 waveplate 124 as a control device by using second feedback signals 206 and this will be described below.

Figure 10:
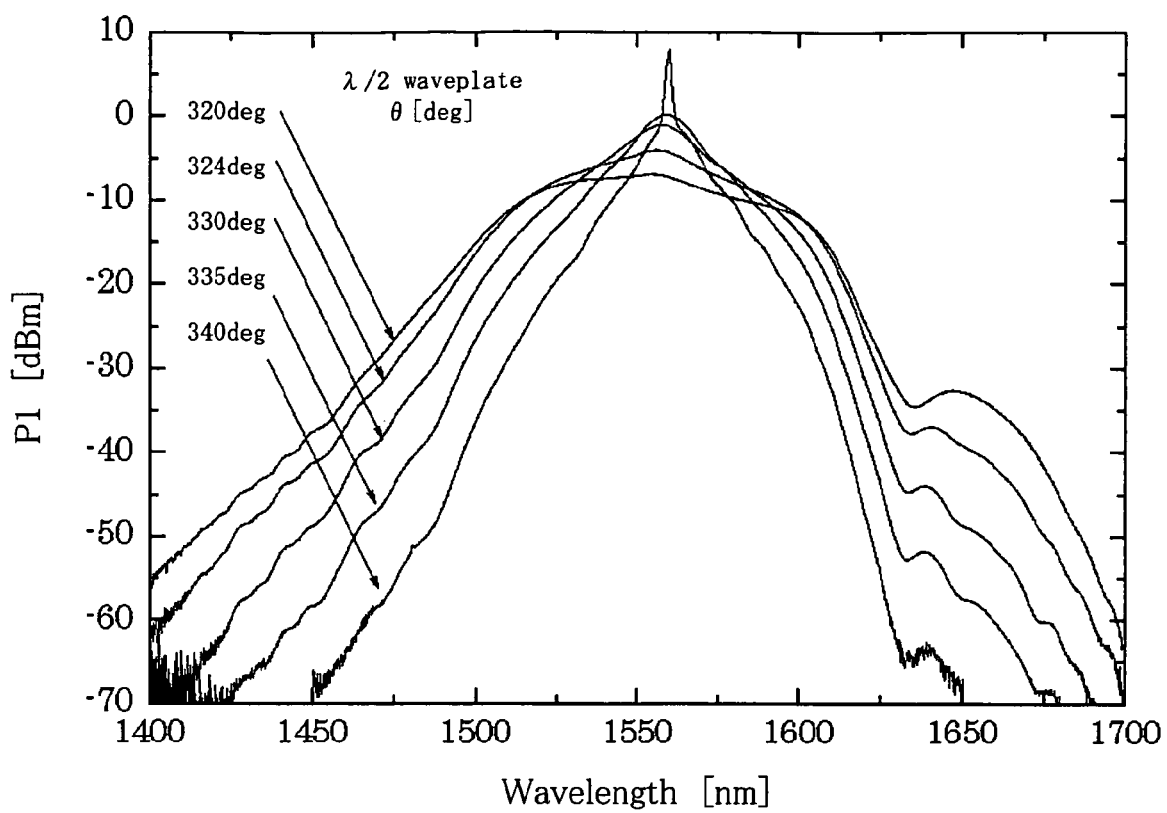
FIG. 10: the characteristic pattern of the characteristic of the optical pulse outputted in the first example.

FIG. 10 shows the change of the light pulse as the noise-like laser outputted by the optical pulse-generating device by the rotation of the λ/2 waveplate. The axis of ordinate represents optical signal strength P1 and the axis of abscissa represents the wavelength (nm.) The rotation angle shown in this figure expresses the graduation read of second automatic rotation stage 222 (FIG. 7.) In this example, the optical pulse becomes the wide bandwidth spectrum in 320 degrees of the rotation angle rather than other angles shown in this figure.

Figure 11:
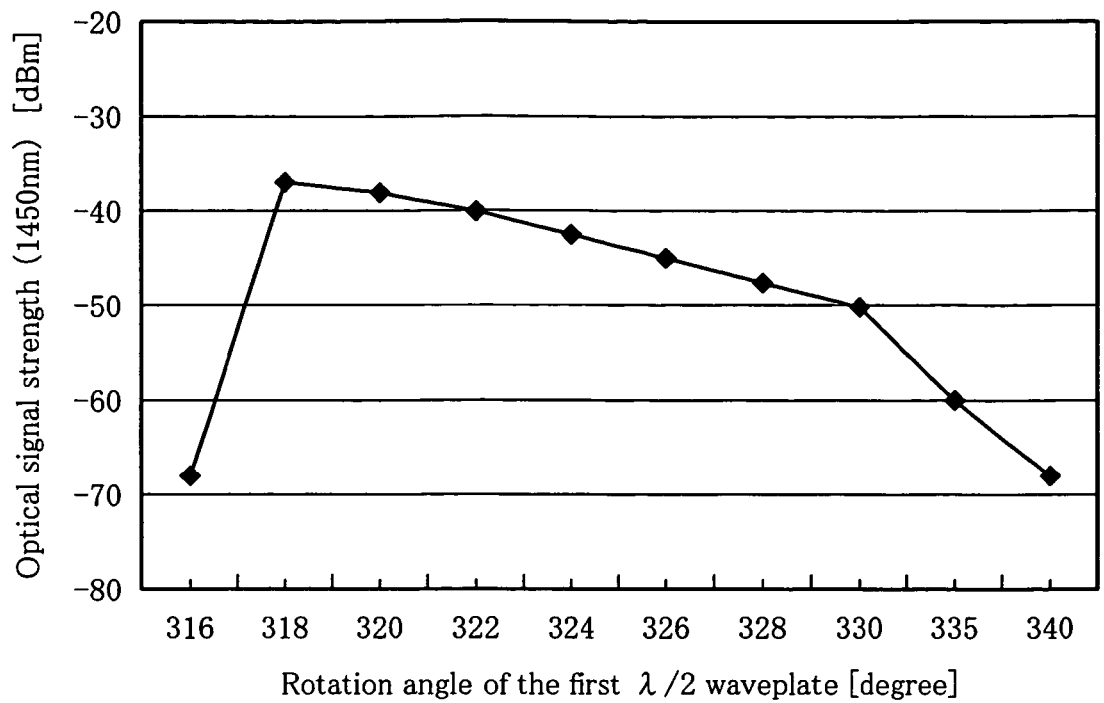
FIG. 11: the characteristic pattern showing dependency of the optical signal strength at 1450 nm wavelength on the rotation angle of the λ/2 waveplate in the first example.

FIG. 11 shows dependency of optical signal strength on the rotation angle of the λ/2 waveplate, when the light of 1450 nm wavelength is used. When the rotation angle of second automatic rotation stage 222 is 340 degrees, the shown state is that mode-locking is not maintained. The best wide bandwidth spectrum, in which mode-locking is operable, is obtained, in consideration combined with FIG. 10, in the case where the rotation angle is 320 degrees. In the case where the rotation angle is 318 degrees, a peak value is shown. Thus, no decision is made in this angle whether λ/2 waveplate 124 should be rotated in which direction, when the optical signal strength is reduced. In this point, when the rotation angle is 320 degrees, decision can be made for both the rotation angles of cases of increasing and decreasing the optical signal strength. Naturally as shown in FIG. 11, the range of angles, in which the stable operation is carried out in the angle around 320 degrees of the rotation angle, is narrow. In addition, it can be known that when the rotation angle is 90 degrees, the behavior of the signal strength toward an increase and decrease in the rotation angle is asymmetric.

Thus, when rotation control is carried out for λ/2 waveplate 124, the upper limit (the rotation angle 335 degrees) and the lower limit (the rotation angle 318 degrees) is made in the angle range, in which second automatic rotation stage 222 is rotated. In addition, the algorism is employed to decrease gradually the initial rotation state from the upper limit. By using this algorism, monitoring detected output 214 of optical detector 213 shown in FIG. 6, and using second feedback signal 206 to make always strength of a received signal constant as −39 dBm, feedback control of the rotation angle of λ/2 waveplate 124 is carried out on first automatic rotation stage 222. In this way, it is known that stable work is realized in 0.3 dB output of wide bandwidth light source 200 according to the present example, when measurement is operated for 1 hour. The phenomenon, in which mode-locking is not maintained, was not observed. This is the stable work same as that of the case of rotation control of first λ/4 waveplate 123.

Differ from the control as described above, when control is operated regardless of the initial rotation state, it is the observed phenomenon that when any one of first λ/4 waveplate 123 or λ/2 waveplate 124 is subjected to rotation control, the rotation angle comes out of a suitable range to cause mode-locking not maintained. Therefore, it is absolutely necessary that the rotation angles of the upper limit and the lower limit are defined and the rotation angle is adjusted starting from the suitable initial state.

FIRST MODIFIED EXAMPLE OF THE FIRST EXAMPLE

In the first example as described above, the used optical band pass filter 212 was that in which central wavelength λ1 of passing optical pulse 211 for monitoring was 1450 nm and the full width half maximum was 1 nm. The present invention is not restricted to this example. In the next described first modified example, the central wavelength of optical band pass filter 212 (FIG. 6) is changed to 1540 nm.

Figure 12:
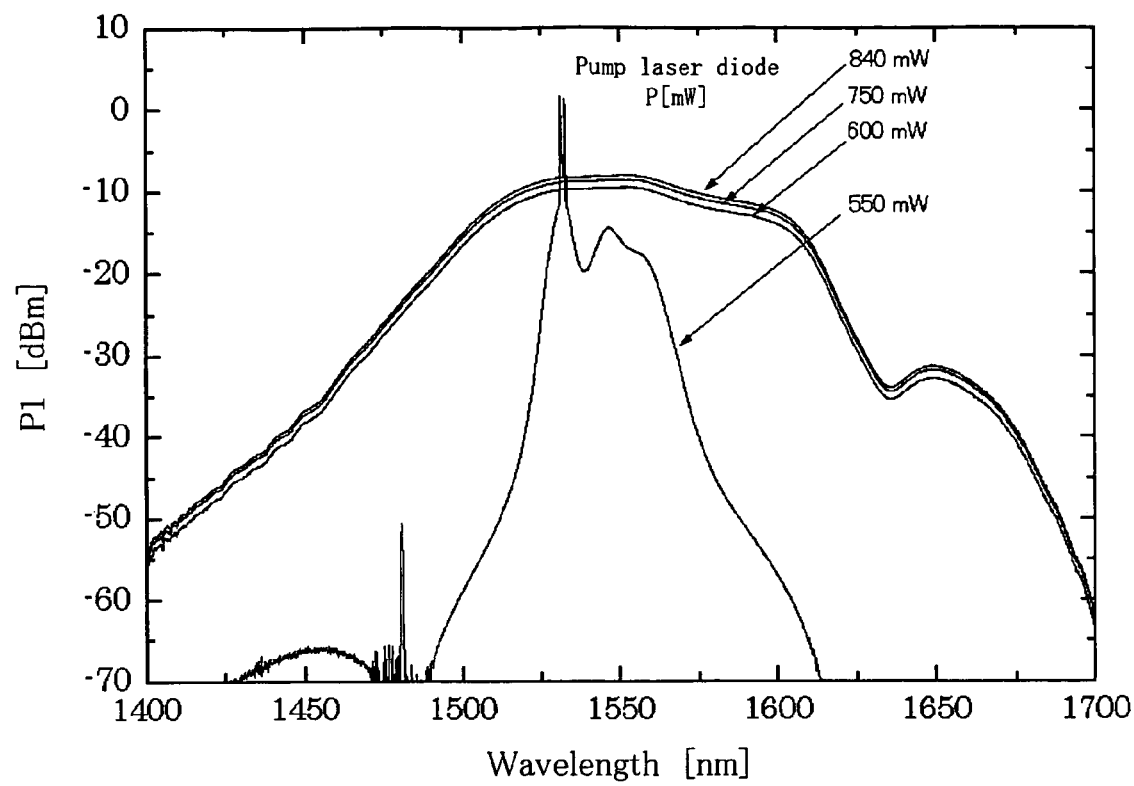
FIG. 12: the characteristic pattern showing an optical pulse spectrum when the output of an pump light source is changed in the first modified example.

FIG. 12 shows a spectrum change of the optical pulse as the noise-like laser, when the output of an pump light emitted from an pump laser diode as an pump light source is changed in this first modified example. Where, pump light 117 of wavelength from laser diode 116 shown in FIG. 7 is stepwise changed from 550 mW to the maximum 840 mW in a plurality of steps to express the relation between optical signal strength P1 and the wavelength of optical pulse 202 outputted from output optical fiber 129.

Figure 13:
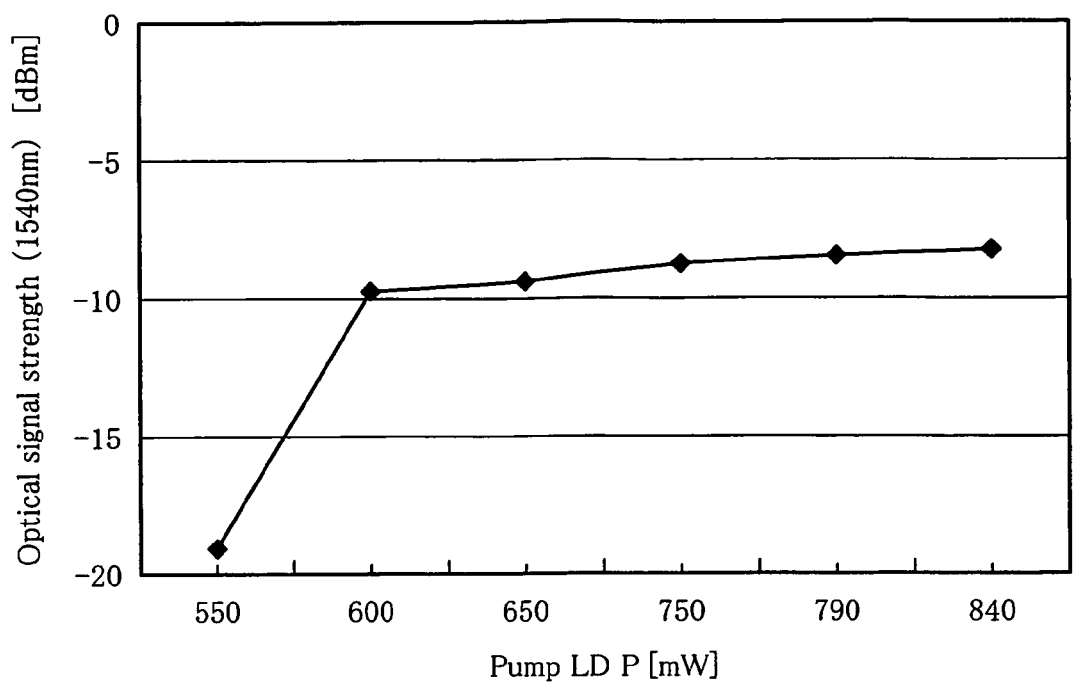
FIG. 13: the characteristic pattern showing a relation between a power and the optical signal strength of the pump light source at a wavelength of 1540 nm in the first modified example.

FIG. 13 shows the relation between power P of the pump light of the pump light source and optical signal strength of optical pulse outputted from output optical fiber in the present modified example, in which the central wavelength of the optical band pass filter is changed to 1540 nm. Also in this modified example, pump light 117 of wavelength from pump laser diode 116 is changed from 550 mW to the maximum 840 m. When power P of the pump light is 550 mW, this small power causes no operation of mode-locking. When power P of the pump light is 600 or higher mW, it is known that optical pulse 202 outputted from output optical fiber 129 (FIG. 7) is stably outputted.

Then, by using monitoring detected output 214 of optical detector 213 as the monitor, power P of pump laser diode 116 was subjected to feedback control to make always the strength of the received light signal constant as −9 dBm. In this way, it is known that more stable work is realized in 0.1 dB output of wide bandwidth light source 200 shown in FIG. 6 than the example, when measurement is operated for 1 hour.

SECOND MODIFIED EXAMPLE OF THE FIRST EXAMPLE

Figure 14:
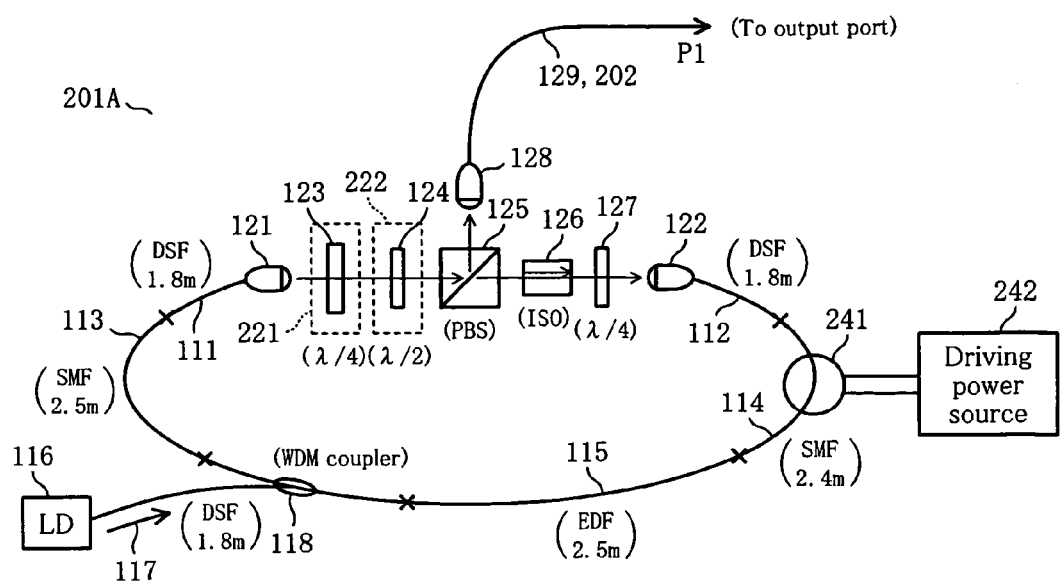
FIG. 14: the schematic block diagram of the optical pulse-generating device in the second modified example.

FIG. 14 corresponding to FIG. 7 shows modifiability of the optical pulse-generating device. The same reference numerals are attached to the same parts in FIG. 14 as those of FIG. 7 and, thus, description of these parts are omitted properly. In optical pulse-generating device 201A of this second modified example, small piezoelectric vibrator 241 is mounted on second single mode optical fiber 114. Driving power source 242 for piezoelectric vibrator 241 is worked by using a switch not illustrated. Then, piezoelectric vibrator 241 vibrates second single mode optical fiber 114 to make mode-locking. As piezoelectric vibrator 241, NB-59S, a product of TDK K.K., and a small buzzer, for example, can be used.

Not only in the wide bandwidth light source as described for the present example, but also, as a general rule, in this kind of the wide bandwidth light source, when it is subjected to a large disturbance and a large acceleration, mode-locking is not maintained. In such the case, conventionally, mode-locking is maintained by a certain disturbance such as stimulating physically the optical fiber by a finger. In the second modified example of the first example, a power switch, which is not illustrated, used for maintaining mode-locking is turned on, mode-locking is automatically operated. Therefore, piezoelectric vibrator 241 is attached to second single mode optical fiber 114 as a part of the optical fiber constituting the noise-like laser. Replaced to this, to other optical fibers 111 to 113 and 115 constituting the noise-like laser may be attached piezoelectric vibrator 241. In the case where optical pulse-generating device 201A does not maintain mode-locking, it is sufficient that driving power source 242 is driven to work piezoelectric vibrator 241 for a few seconds. Following this step, the work is stably operated as described for the first modified example to maintain mode-locking. Consequently, optical pulse-generating device 201A of the second modified example can be used as an automatic recovery function of wide bandwidth light source 200. If mode-locking is not maintained by once application of vibration, it is sufficient to repeat generation of vibration by piezoelectric vibrator 241 and stabilization of the work as described before. On the other hand, for the wide bandwidth light source according to other examples such as the second modified example, which will be described later, the same approach can be applied.

EXAMPLE 2

Figure 15:
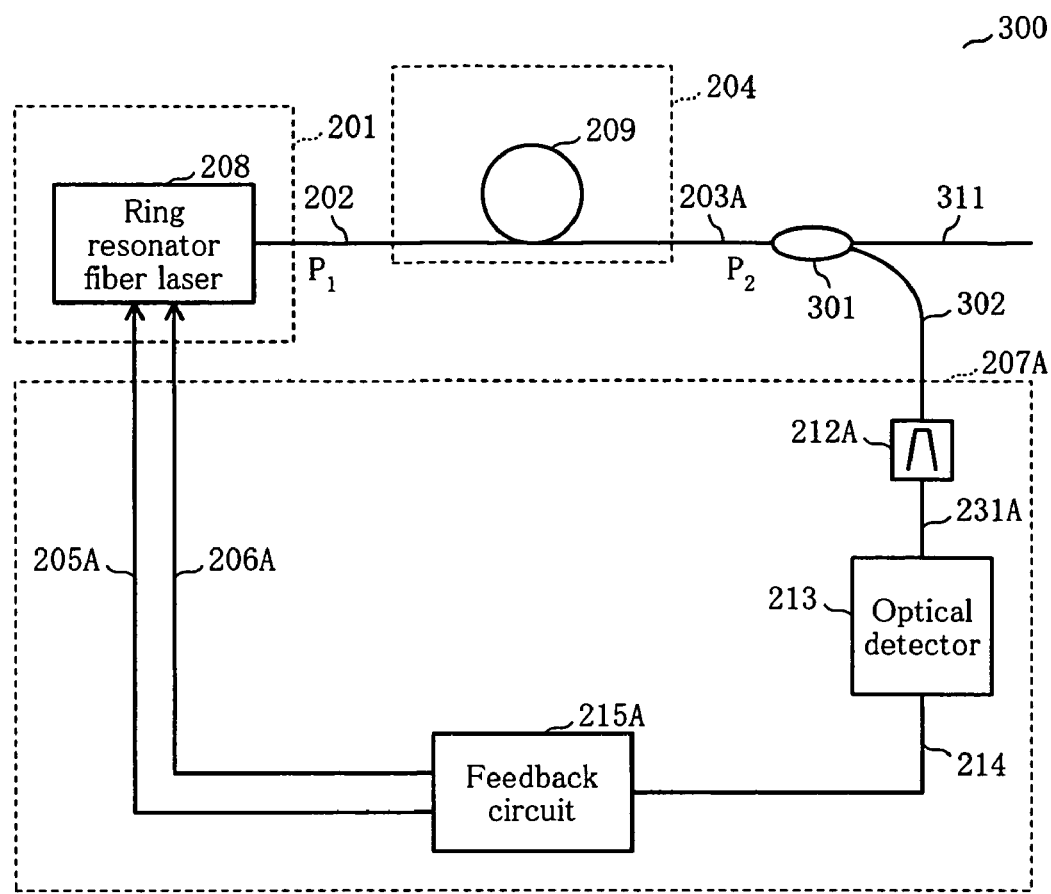
FIG. 15: the schematic block diagram of the wide bandwidth light source of the second example according to the present invention.

FIG. 15 shows wide bandwidth light source in the second modified example according to the present invention. The same reference numerals are attached to the same parts in FIG. 15 as those of FIG. 6 of the first example and, thus, description of these parts are omitted properly. Wide bandwidth light source 300 of the second modified example is constituted by optical pulse-generating device 201, white light-emitting device 204 for emitting white light 203A by inputting optical pulse 202, which is not split, of signal strength P1 of the light outputted by this optical pulse-generating device 201, optical coupler 301 for splitting white light 203A, which has optical signal strength P2, outputted by white light-emitting device 204, and operation-stabilizing circuit 207A for inputting monitoring optical pulse 302 split by this optical coupler 301 to feed first and second feedback signals 205A and 206A to optical pulse-generating device 201. Where, in optical pulse-generating device 201, ring resonator fiber laser 208 shown in FIG. 7 is arranged. In white light-emitting device 204, HNL fiber 209 is used. Optical coupler 301 splits white light 203A outputted by white light-emitting device 204 to make the proportion 1:9 of optical signal strength P2. And, 10 percents of the light having signal strength P2 are fed to operation-stabilizing circuit 207 as monitoring optical pulse 302. 90 percents of the light having signal strength P2 becomes wide bandwidth light source 311.

According to this second example, in operation-stabilizing circuit 207A are arranged optical band pass filter 212A with 1140 nm central wavelength and 1 nm full width half maximum, optical detector 213 for converting passed light component 231A of this optical band pass filter 212A to the electric signal, and feedback circuit 215A for inputting detected output 214 of this optical detector 213. Feedback circuit 215A outputs first feedback signal 205A, which is supplied to first automatic rotation stage 221 of ring resonator fiber laser 208, which is shown in FIG. 7, for controlling, and second feedback signal 206A, which is supplied to second automatic rotation stage 222, for controlling.

Figure 16:
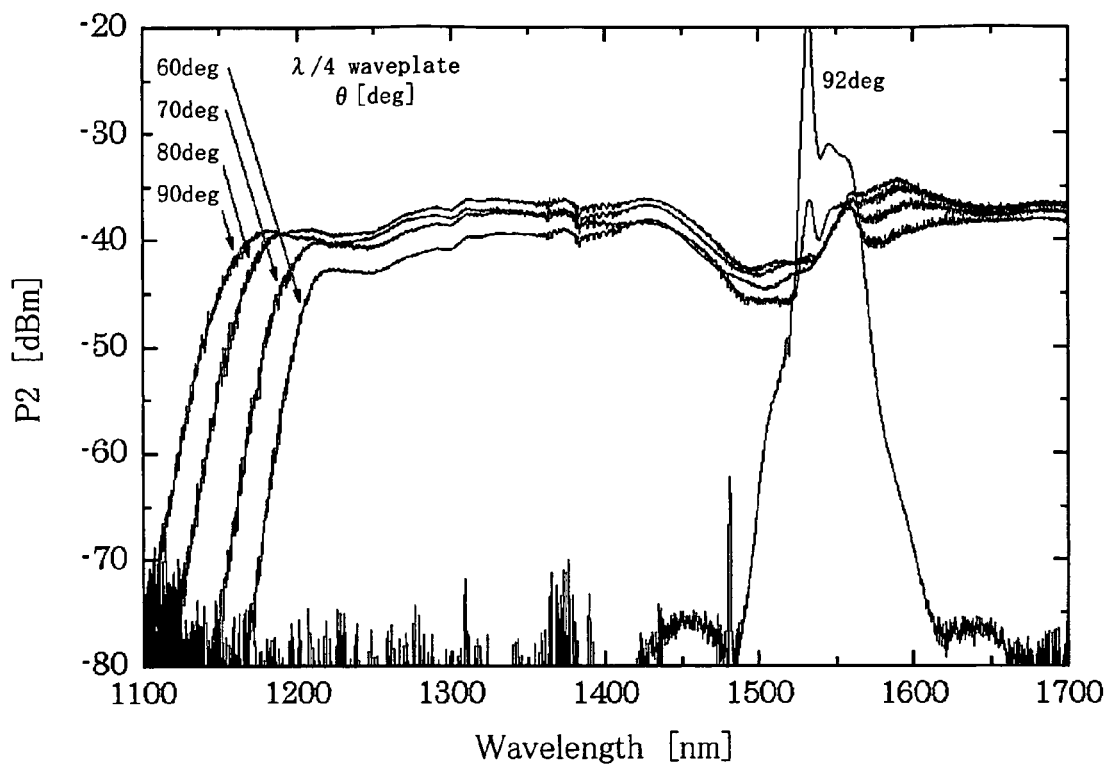
FIG. 16: the spectrum characteristic pattern of the wide bandwidth light source to the rotation angle of the first λ/4 waveplate of the second example.

FIG. 16 shows the change of the optical pulse as the noise-like laser in the second example caused by the rotation of the first λ/4 waveplate. This FIG. 16 corresponds to FIG. 18 of the first example. In FIG. 16, the axis of ordinate represents signal strength P2 of the light outputted through splitting by white light-emitting device 204 of FIG. 15. On the other hand, the axis of abscissa represents wavelength nm.) The rotation angle shown in this FIG. 16 expresses the graduation value of first automatic rotation stage 221 (FIG. 7.) This point is same as that of the first example.

Figure 17:
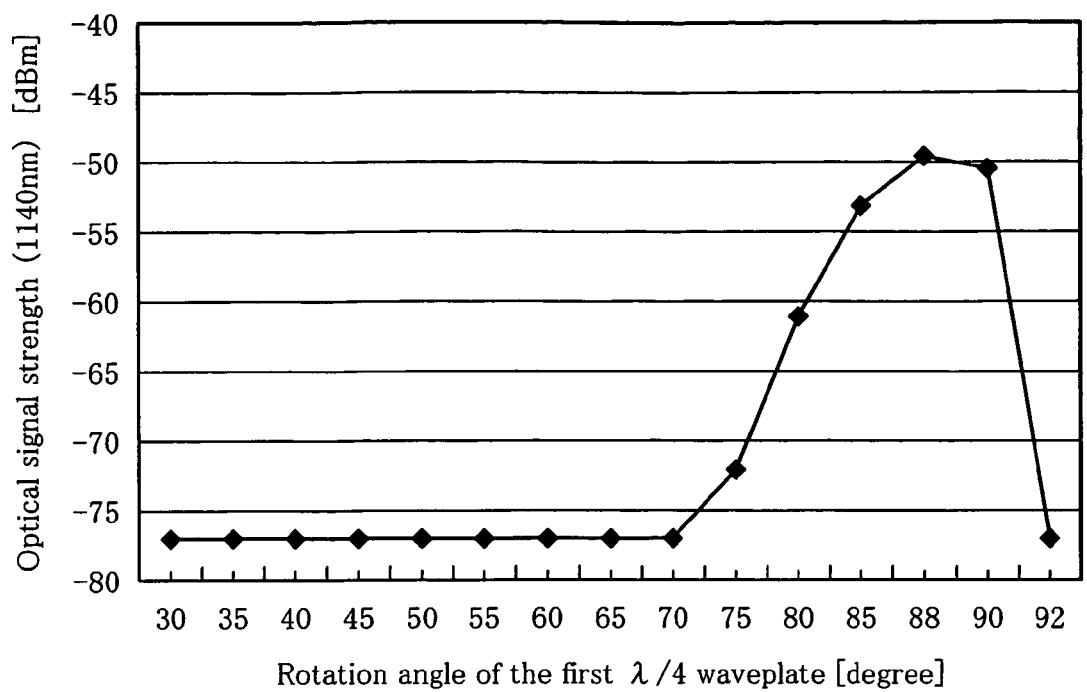
FIG. 17: the characteristic pattern showing dependency of the optical signal strength at 1140 nm wavelength on the rotation angle of the first λ/4 waveplate in the second example.

FIG. 17 shows dependency of signal strength of the light of 1140 nm wavelength, when the rotation angle of the first λ/4 waveplate is changed. When the rotation angle of first automatic rotation stage 221 is 92 degrees, the shown state is that mode-locking is not maintained. The best wide bandwidth spectrum, in which mode-locking is operable, is obtained, in consideration combined with FIG. 16, in the case where the rotation angle is 90 degrees. However, as shown in FIG. 17, the range of angles, in which the stable operation is carried out in the angle around 90 degrees of the rotation angle, is narrow. In addition, the behavior of the signal strength toward the increase and decrease in the rotation angle is asymmetric.

Hence, when the rotation of first λ/4 waveplate 123 is controlled in the second example, the upper limit (the rotation angle 91 degrees) and the lower limit (the rotation angle 70 degrees) are made in the angle range, in which first automatic rotation stage 221 is rotated. In addition, the algorism is employed to increase gradually the initial rotation state from the lower limit. By using this algorism, monitoring detected output 214 of optical detector 213 shown in FIG. 15, and using first feedback signal 205A to make always strength of the received signal constant as −53 dBm, feedback control of the rotation angle of first λ/4 waveplate 123 is carried out on first automatic rotation stage 221. In this way, it is known that stable work is realized in 0.2 dB output of wide bandwidth light source 300 according to the second example, when measurement is operated for 1 hour. The phenomenon, in which mode-locking is not maintained, was not observed.

The above described is the case where wide bandwidth light source 300 is stably operated by controlling the rotation of first λ/4 waveplate 123 by using first feedback signal 205A. Next, It is possible to use λ/2 waveplate 124 as the control device by using second feedback signals 206A and this will be described below.

Figure 18:
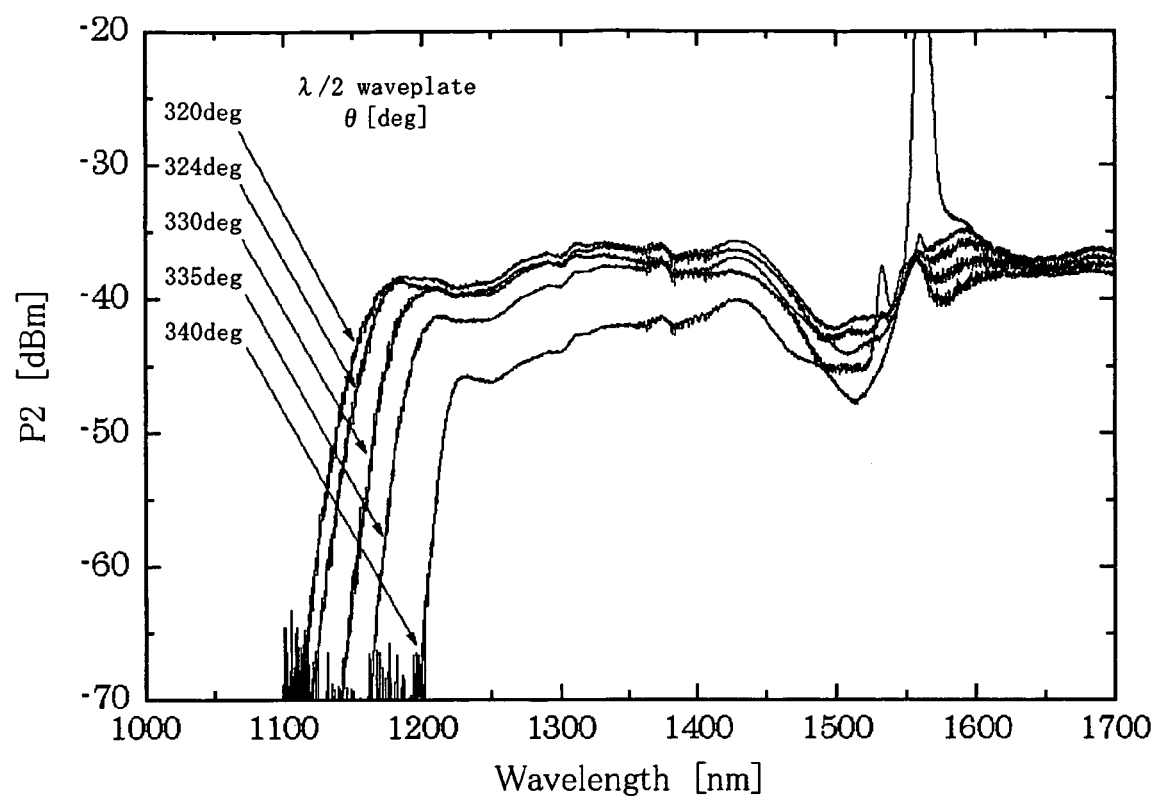
FIG. 18: the spectrum characteristic pattern showing the optical pulse of the wide bandwidth light source to the rotation of the λ/2 waveplate in the second example.

FIG. 18 shows the change of the light pulse as the noise-like laser, which is outputted by the optical pulse-generating device according to the second example, by the rotation of the λ/2 waveplate. The axis of ordinate represents optical signal strength P2 and the axis of abscissa represents the wavelength (nm.) The rotation angle shown in this figure expresses the graduation value of second automatic rotation stage 222 (FIG. 7.) Also in this example, the optical pulse becomes the wide bandwidth spectrum in 320 degrees of the rotation angle rather than other angles shown in this figure.

Figure 19:
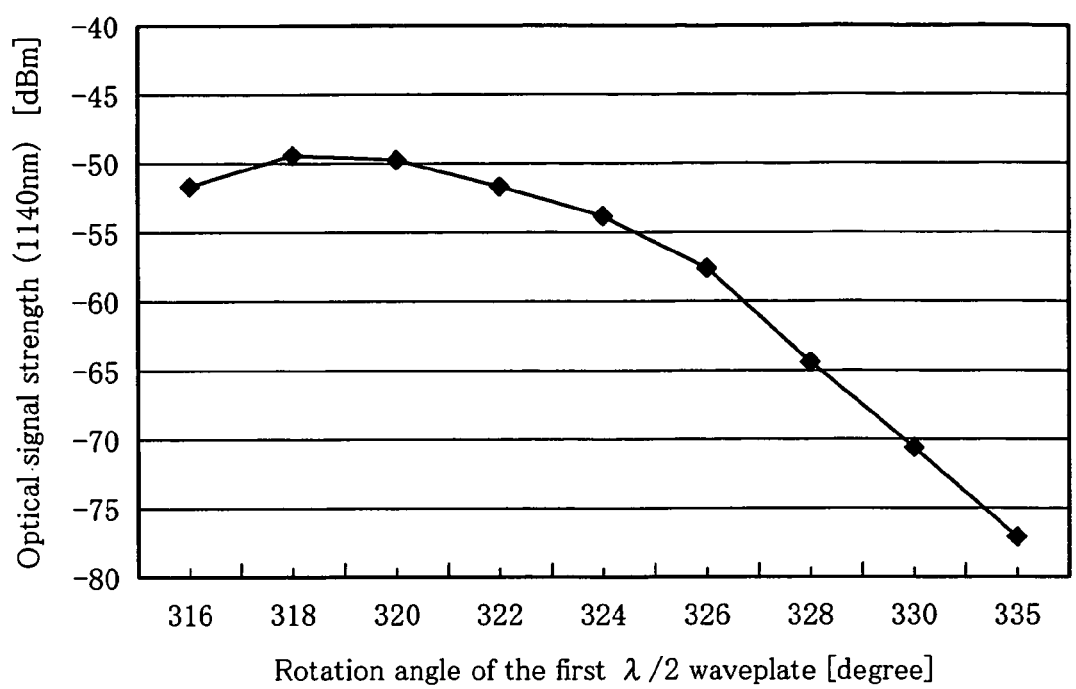
FIG. 19: the characteristic pattern showing dependency of the optical signal strength at 1140 nm wavelength on the rotation angle of the λ/2 waveplate in the second example.

FIG. 19 shows dependency of signal strength of the light of 1140 nm wavelength, when the rotation angle of the λ/2 waveplate is changed. When the rotation angle of second automatic rotation stage 222 is 340 degrees as shown in FIG. 18, the shown state is that mode-locking is not maintained. The best wide bandwidth spectrum, in which mode-locking is operable, is obtained, in consideration combined with FIG. 18, in the case where the rotation angle is 320 degrees. However, as shown in FIG. 19, the range of angles, in which the stable operation is carried out in the angle around 320 degrees of the rotation angle, is narrow. In addition, the behavior of the signal strength toward the increase and decrease in the rotation angle is asymmetric.

Therefore, when the rotation of λ/2 waveplate 124 is controlled in wide bandwidth light source 300, the upper limit (the rotation angle 335 degrees) and the lower limit (the rotation angle 316 degrees) are made in the angle range, in which second automatic rotation stage 222 is rotated. In addition, the algorism is employed to increase gradually the initial rotation state from the lower limit. By using this algorism, detected output 214 of optical detector 213 shown in FIG. 15 is monitored. And, using second feedback signal 206A to make always strength of the received signal constant as −50 dBm, feedback control of the rotation angle of λ/2 waveplate 124 is carried out on second automatic rotation stage 222. In this way, it is known that stable work is realized in 0.2 dB output of wide bandwidth light source 300 according to the second example, when measurement is operated for 1 hour. The phenomenon, in which mode-locking is not maintained, was not observed. This is the stable operation similar to that of the rotation control of first λ/4 waveplate 123.

Fifer from the above described control, the case, where, control is performed regardless of the initial rotation state, will be described below. In this case, it is the observed phenomenon that mode-locking is not maintained, when any one of first λ/4 waveplate 123 or λ/2 waveplate 124 is subjected to rotation control resulting in that the rotation angle comes out of a suitable range. Therefore, it is absolutely necessary that the upper limit and the lower limit of the rotation angle should be defined and the rotation angle should be adjusted starting from the suitable initial state.

EXAMPLE 3

Figure 20:
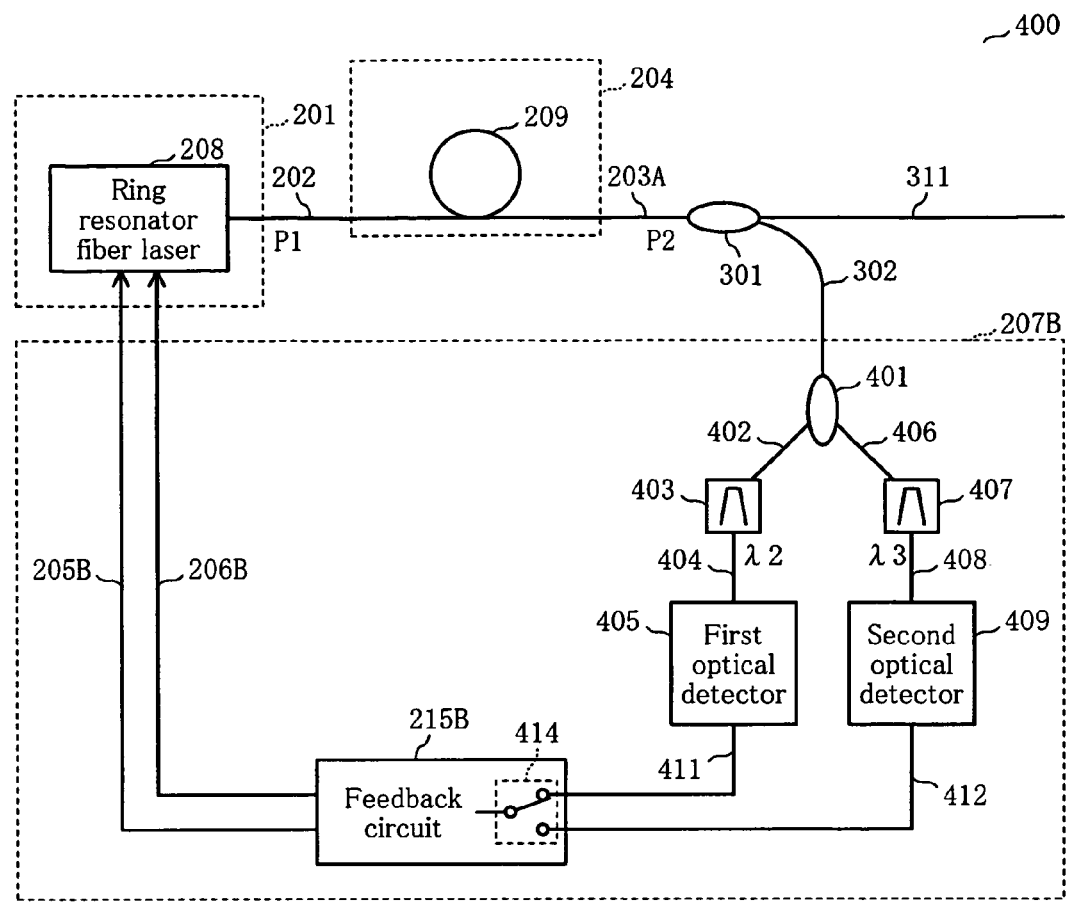
FIG. 20: the schematic block diagram of the wide bandwidth light source of the third example according to the present invention.

FIG. 20 shows the wide bandwidth light source of the third example according to the present invention. The same reference numerals are attached to the same parts in FIG. 20 as those of FIG. 15 of the second example and, thus, description of these parts are omitted properly. Wide bandwidth light source 400 of the third example is constituted by optical pulse-generating device 201, white light-emitting device 204 for emitting white light 203A by inputting optical pulse 202, which is not split, of signal strength P1 of the light outputted by this optical pulse-generating device 201, optical coupler 301 for splitting white light 203A of signal strength P2 of the light outputted by white light-emitting device 204, and operation-stabilizing circuit 207B for inputting monitoring optical pulse 302 split by this optical coupler 301 to feed first and second feedback signals 205A and 206A to optical pulse-generating device 201. Where, in optical pulse-generating device 201, ring resonator fiber laser 208 shown in FIG. 7 is arranged. In white light-emitting device 204, HNL fiber 209 is used. Optical coupler 301 splits white light 203A outputted by white light-emitting device 204 to make the proportion 1:9 of optical signal strength P2. And, 10 percents of the light having signal strength P2 are fed to operation-stabilizing circuit 207 as monitoring optical pulse 302. 90 percents of the light having signal 76 strength P2 becomes wide bandwidth light source 311.

In this third example, WDM coupler 401 is arranged in operation-stabilizing circuit 207B for inputting monitoring optical pulse 302 to split 2 wavelength components with the central wavelength λ2 and a central wavelength λ3. Monitoring light 402 with the central wavelength λ2 split by WDM coupler 401 is inputted in first optical band pass filter 403 with 1140 nm central wavelength λ2. Passed light component 404 of first optical band pass filter 403 is inputted in first optical detector 405 to be converted to the electric signal. Similarly, monitoring light 406 with the central wavelength λ3 split by WDM coupler 401 is inputted in second optical band pass filter 407 with 1350 nm central wavelength λ3. Passed light component 408 of second optical band pass filter 407 is inputted in second optical detector 409 to be converted to the electric signal. Each of first detection output 411, which is outputted from first optical detector 405, and second detection output 412, which is outputted from second optical detector 409, is inputted in feedback circuit 215B.

Feedback circuit 215B has new selection circuit 414 for selecting one of first detection output 411 and second detection output 412 according of a direction. By selection circuit 414 using one selected from the detection outputs, first feedback signal 205B to be fed to first automatic rotation stage 221 of ring resonator fiber laser 208, which is shown in FIG. 7, for controlling and second feedback signal 206B to be fed second automatic rotation stage 222 for controlling are outputted. It is unnecessary to output both the first feedback signal 205B and second feedback signal 206B at the same time, similarly to feedback circuit 215 and 215A of other examples. It is allowed that the circuit configuration is of outputting one of first feedback signal 205B and second feedback signal 206B.

Figure 21:
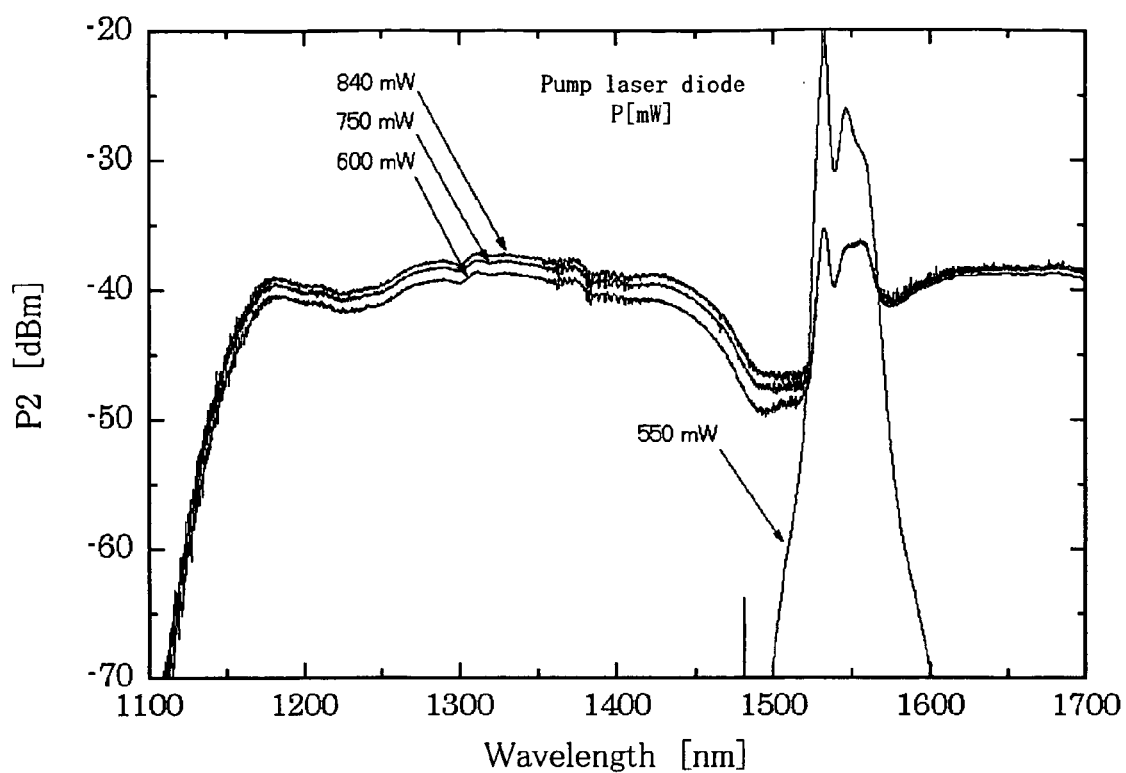
FIG. 21: the characteristic spectrum pattern showing the wide bandwidth light source, when the output of the pump light is changed in the third modified example.

FIG. 21 shows a spectrum change of the wide bandwidth light source outputted when the output of the pump light of the pump laser diode in this third example is changed. In this figure, the relation between signal strength P2 of the light, which is outputted from white light-emitting device 204, and the wavelength is expressed through changing stepwise pump light 117 of wavelength from laser diode 116, which is shown in FIG. 7, from 550 mW to the maximum 840 mW in a plurality of steps. When the power P of the pump light is 550 mW, mode-locking is not maintained because of its weak power. It is known that when the power P of the pump light is 600 or higher mW, white light 203A having optical signal strength P2 is stably outputted by white light-emitting device 204. Thus, rotation control of first λ/4 waveplate 123 can be carried out similarly to the second example.

Figure 22:
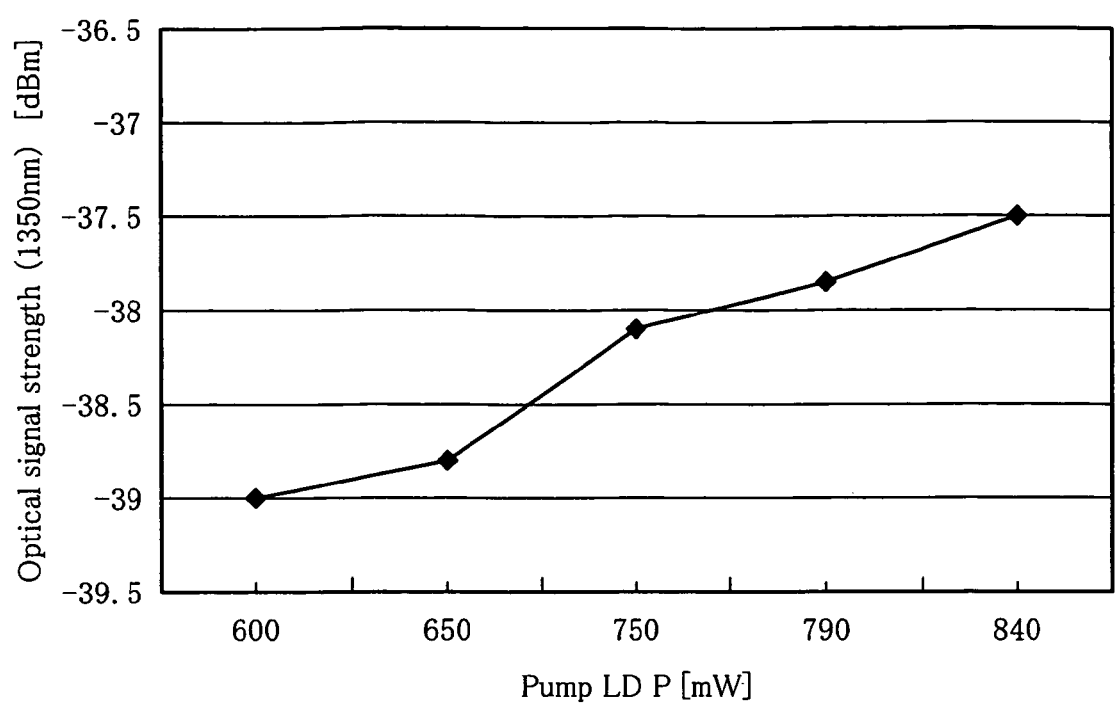
FIG. 22: the characteristic pattern showing the relation between the power and the optical signal strength of the pump light source at the wavelength of 1350 nm in the third modified example.

FIG. 22 shows the relation between the power P of the pump light of the pump light source of the wavelength 1350 nm and the optical signal strength of the wide bandwidth light source, when the feedback circuit executes feedback control by using the second detection output obtained from the second optical detector in this third example. In case of this example, second detection output 412 from second optical detector 409 through second optical band pass filter 407 shown in FIG. 20 is selected by feedback circuit 215B for use as the monitoring output. In case of this example, an pump LD power is subjected to feedback control to make always strength of the received signal constant as −38 dBm. In this way, it is found that the output of wide bandwidth light source 400 according to the third example is stable 0.05 dB in measurement for 1 hour.

According to the examples as described above, 10 percents of the white light outputted from white light-emitting device 204 is fed to operation-stabilizing device. This proportion may be five percents and maybe other proportions. On the other hand, central wavelength λ1 of the monitoring optical pulse may be other than those used in the examples as described above. As described below, for example, the wavelength of 1240 nm and the wavelength of 1470 nm may be usable.

EXAMPLE 4

Figure 23:
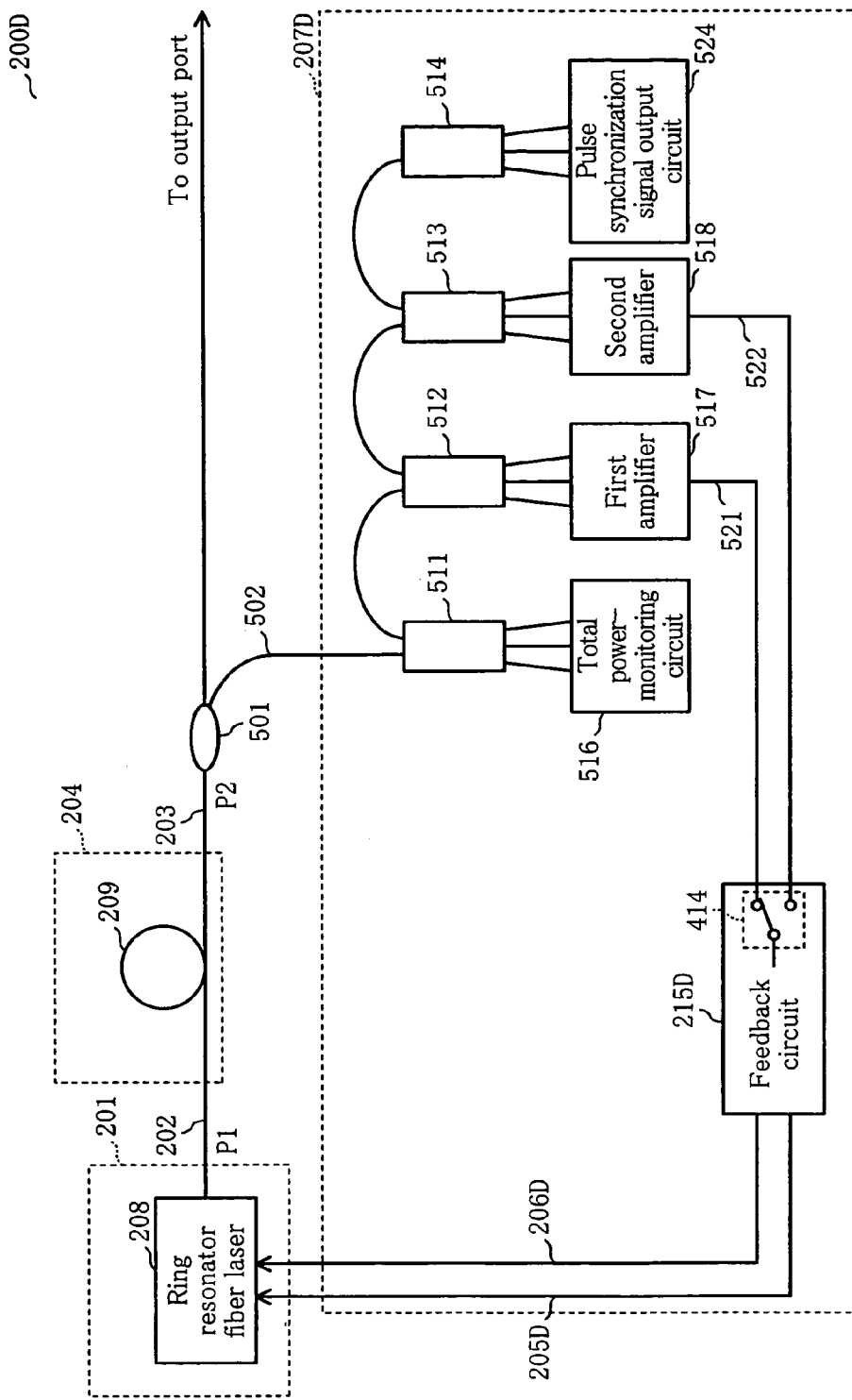
FIG. 23: the schematic block diagram showing a main part of wide bandwidth light source of the fourth example according to the present invention.

FIG. 23 shows a main part of wide bandwidth light source in the fourth example according to the present invention. In FIG. 23, the same reference numerals are attached to the same parts in FIG. 23 as those of FIG. 6 and, thus, description of these parts are omitted properly. Wide bandwidth light source 200D of the present example is constituted by optical pulse-generating device 201, white light-emitting device 204 for emitting white light 203 by inputting optical pulse 202 outputted by this optical pulse-generating device 204, optical coupler 501 for splitting white light 203 outputted by HNL (highly nonlinear) fiber 209 of white light-emitting device 204 in the proportion of 95 to 5, and operation-stabilizing circuit 207D for inputting 5 percents of white light 203 split by this optical coupler 501. The rest (95 percents) of split white light 203 is sent to an output port not illustrated.

In this wide bandwidth light source 200D, white light 502 sent from optical coupler 501 to operation-stabilizing circuit 207D is inputted to first splitting detector 511. First to fourth splitting detectors 511 to 514 are constituted by a serial circuit and each of these receives a part of an incident light for detection and reflects the rest of the light toward a detector or a circuit in the next stage. If white light 203 inputted in optical coupler 501 is 5 µW/nm, First splitting detector 511 receives 0.25 µW/nm which is 5 percents thereof. First splitting detector 511 as well as second to fourth splitting detectors 512 to 514 are constituted by A/D (analog/digital) converting device and the splitting device. The light of 0.02 µW/nm is subjected to A/D conversion carried out for monitoring the total power and the remained 0.25 µW/nm is reflected to send to second splitting detectors 512. Following these steps, second splitting detectors 512 reflects 0.21 µW/nm to send to third splitting detectors 513 and third splitting detectors 513 reflects 0.194 µW/nm to send to fourth splitting detectors 514.

Second splitting detectors 512 has a dielectric filter (not illustrated.) Through second splitting detectors 512, the light component of 1240 nm in the incident light of 0.23 µW/nm is passed to subject the signal level of the passed light to A/D conversion. Other wavelength components are reflected toward third splitting detectors 513. Third splitting detectors 513 has also the dielectric filter (not illustrated.) Through third splitting detectors 513, the light component of 1470 nm in the incident light of 0.21 µW/nm is passed to be subjected to the passed light to A/D conversion. Other wavelength components are reflected toward fourth splitting detectors 514. In fourth splitting detectors 514, the incident light of 0.194 µW/nm is subjected to A/D conversion. For wavelengths of 1240 nm and 1470 nm, the light components are passed in the range of the wavelength width between 10 and 20 nm.

The output obtained after A/D conversion of first splitting detector 511 as described above is inputted in a total power-monitoring circuit. Total power-monitoring circuit 516 is the circuit for monitoring a total power of the light. At the point, where the power outputted as the wide bandwidth light source is controlled to exceed a reference value, stabilized control is completed.

The output obtained after A/D conversion of second splitting detector 512 is inputted in first amplifier 517 and amplified to input in the one input terminal of feedback circuit 215D as first detection output 521. The output obtained after A/D conversion of third splitting detector 513 is inputted in second amplifier 518 and amplified to input in the other input terminal of feedback circuit 215D as second detection output 522. Feedback circuit 215D has selection circuit 414 as shown in FIG. 20. By selection circuit 414 using one selected from the detection outputs, first feedback signal 205D to be fed to first automatic rotation stage 221 of ring resonator fiber laser 208, which is shown in FIG. 7, for controlling and second feedback signal 206D to be fed second automatic rotation stage 222 for controlling are outputted. It is unnecessary to output both the first feedback signal 205D and second feedback signal 206D at the same time, similarly to feedback circuit 215 and 215A of other examples. It is allowed that the circuit configuration is of outputting one of them. This point is same as that of the third example.

The output obtained after A/D conversion of fourth splitting detector 514 is inputted in pulse synchronization signal output circuit 524. Pulse synchronization signal output circuit 524 is the circuit used for making synchronization of light pulses.

Wide bandwidth light source 200D of the fourth example will be described with the 1240 nm light component obtained from second splitting detector 512 as an example. In case of this example, it is known that in the position, in which the power outputted by wide bandwidth light source 200D becomes maximum and the total power detected by total power-monitoring circuit 516 becomes minimum, the spectrum of white light 203 outputted from white light-emitting device 204 to the output port through optical coupler 501 is extends to a widest range. This will be described below.

Selection circuit 414 of feedback circuit 215D shown in FIG. 23 is set to select only first detection output 521 outputted by first amplifier 517. On the other hand, is set to feed to first automatic rotation stage 221 for first λ/4 waveplate 123, which is shown in FIG. 7, as first feedback signal 205D or to second automatic rotation stage 222 for λ/2 waveplate 124 as second feedback signal 206D. First, description will be given to the case, where the detection output of the light component of 1240 nm is fed to first automatic rotation stage 221 for first λ/4 waveplate 123, which is shown in FIG. 7, as first feedback signal 205D.

Figure 24:
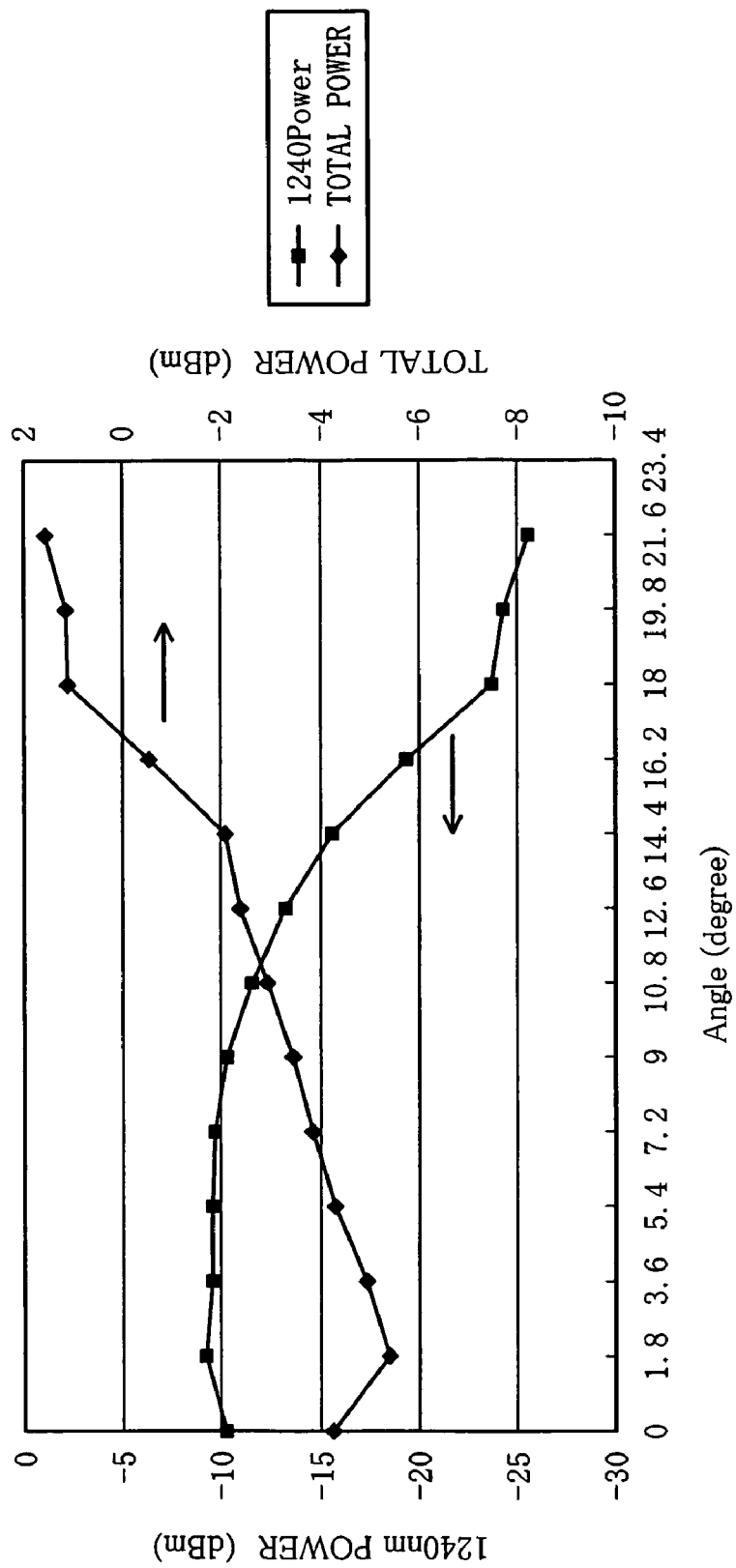
FIG. 24: the characteristic pattern showing the change of the power, when the λ/4 waveplate is rotated in an oscillation state in the fourth example.
Figure 25:
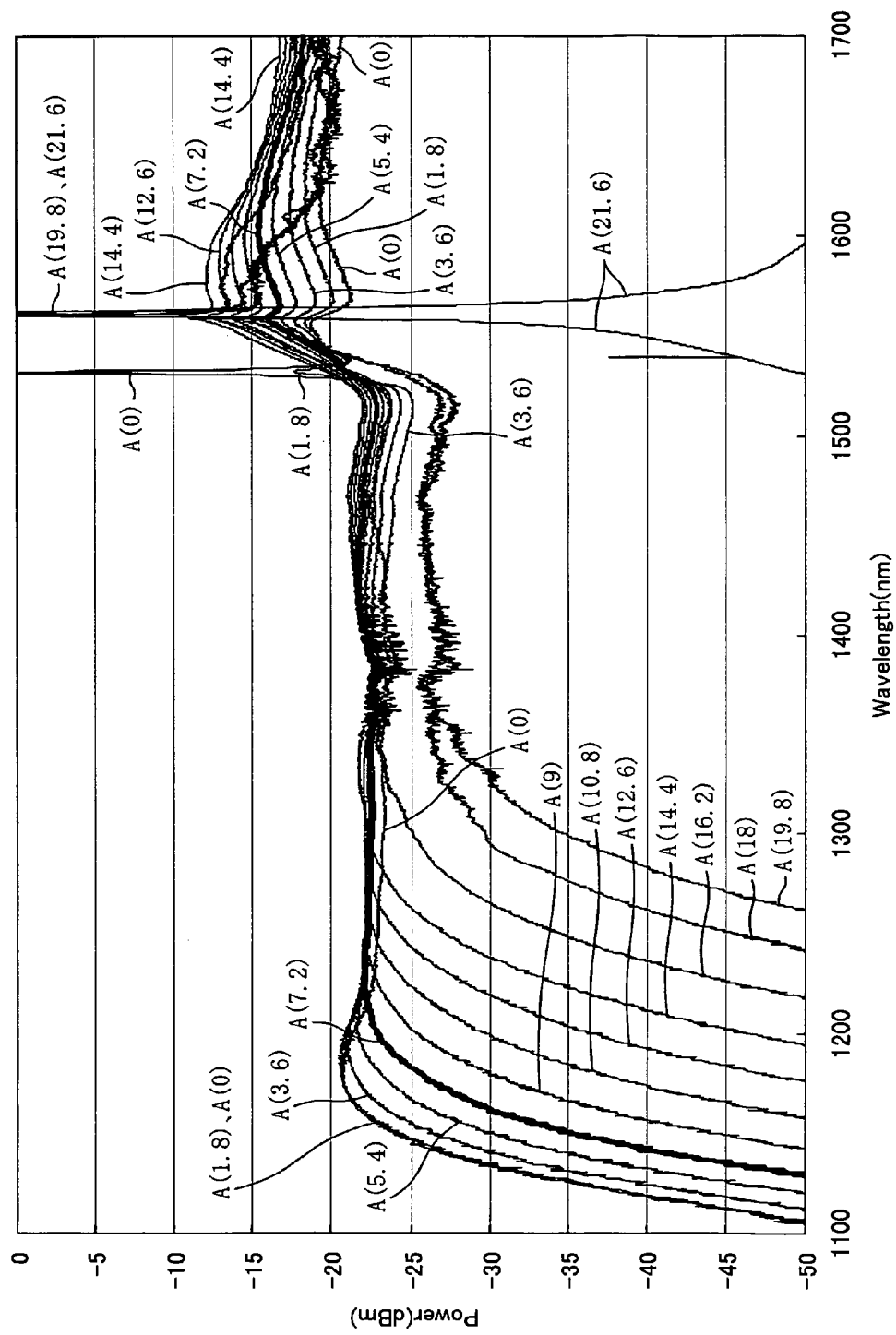
FIG. 25: the characteristic pattern showing the spectrum, when the λ/4 waveplate is rotated in the oscillation state in the fourth example.

FIG. 24 shows the change of the total power when first λ/4 waveplate is rotated in the state, in which the detection output of the 1240 nm light component is fed. On the other hand, FIG. 25 shows the spectrum when first λ/4 waveplate is rotated. The angle of first λ/4 waveplate 123 shown in FIG. 7 represents a relative value and the state, in which the spectrum extends widest, (characteristic curve A (0)) is defined as 0 degree. In FIG. 25, the characteristic curve of the angle "X" is expressed by A(X.) Where, "X" is taken from a series of values 0, 1.8, 3.6, 5.4, 7.2, 9, 10.8, 12.6, 14.4, 16.2, 18, 19.8, and 21.6. From FIG. 24, it is known that oscillation is occurs in the range of about 20 degrees. In addition, from FIG. 24 and FIG. 25, it is known that the power of 1240 nm light becomes maximum and the total power becomes minimum in 1.8 degrees. The thick characteristic curve A (7.2) in FIG. 25 emphasizes that, which becomes flattest, by an illustration.

Next, description will be given to the case, where the detection output of the light component of 1240 nm is fed to second automatic rotation stage 222 for λ/2 waveplate 124, which is shown in FIG. 7, as second feedback signal 206D.

Figure 26:
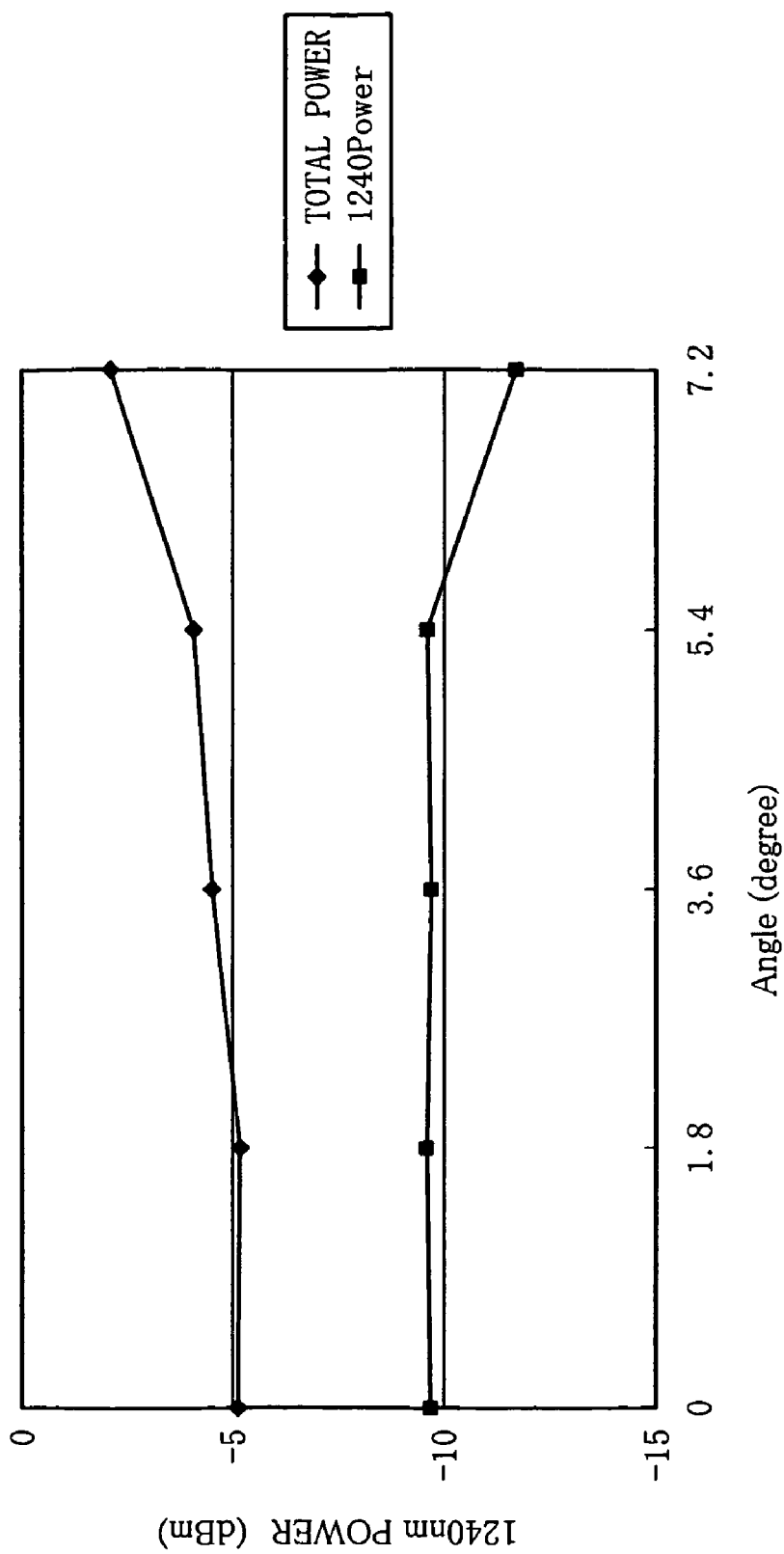
FIG. 26: the characteristic pattern showing the change of the power, when the λ/2 waveplate is rotated in an oscillation state in the fourth example.
Figure 27:
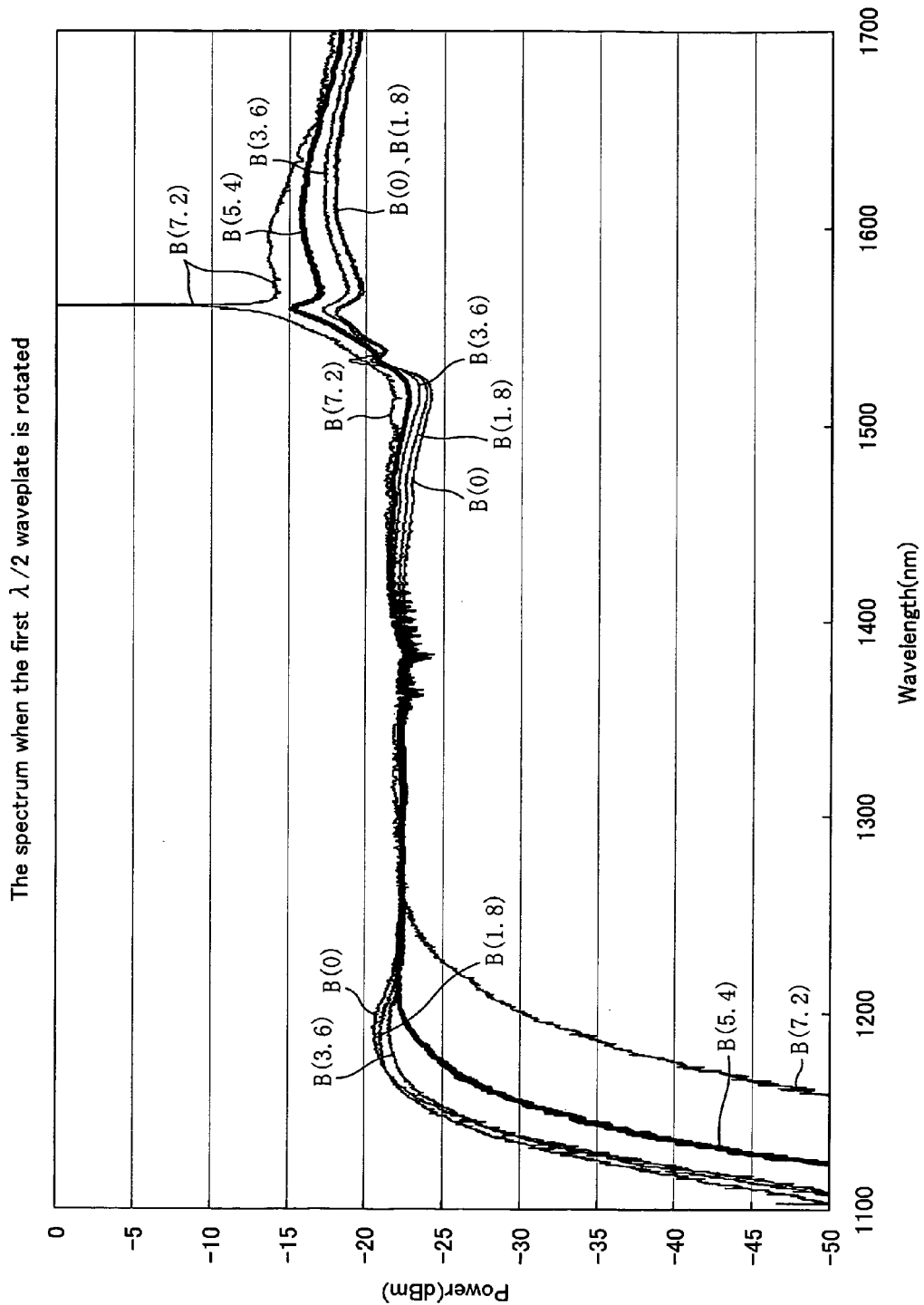
FIG. 27: the characteristic pattern showing the spectrum, when the λ/2 waveplate is rotated in the oscillation state in the fourth example.

FIG. 26 shows the change of the total power when λ/2 waveplate is rotated in the state, in which the detection output of the 1240 nm light component is fed. On the other hand, FIG. 27 shows the spectrum when λ/2 waveplate is rotated. In FIG. 27, the characteristic curve of the angle "X" is expressed by B(X.) Where, "X" is taken from the series of values 0, 1.8, 3.6, 5.4, and 7.2. The oscillation is possible range is narrow as about 7 degrees as shown in FIG. 26. Also in the case where control is operated by using λ/2 waveplate 124, similar to first λ/4 waveplate 123 shown in FIG. 24 and FIG. 25, it is known that the spectrum of white light 203 becomes widest in the position, in which the power of 1240 nm light becomes maximum and the total power becomes minimum. The thick characteristic curve B (5.4) in FIG. 26 emphasizes that, which becomes flattest, by an illustration.

As described above, what the rotation angle of first λ/4 waveplate 123 shown in FIG. 25 is adjusted and the rotation angle of λ/2 waveplate 124 shown in FIG. 27 is adjusted enables to make the spectrum of white light 203, which is outputted from optical coupler 501 shown in FIG. 23, in the output port to that having a wide bandwidth. Also in this wide bandwidth light source of this fourth example, adding vibration to the single mode optical fiber constituting the ring resonator fiber laser allows operating mode-locking.

EXAMPLE 5

Figure 28:
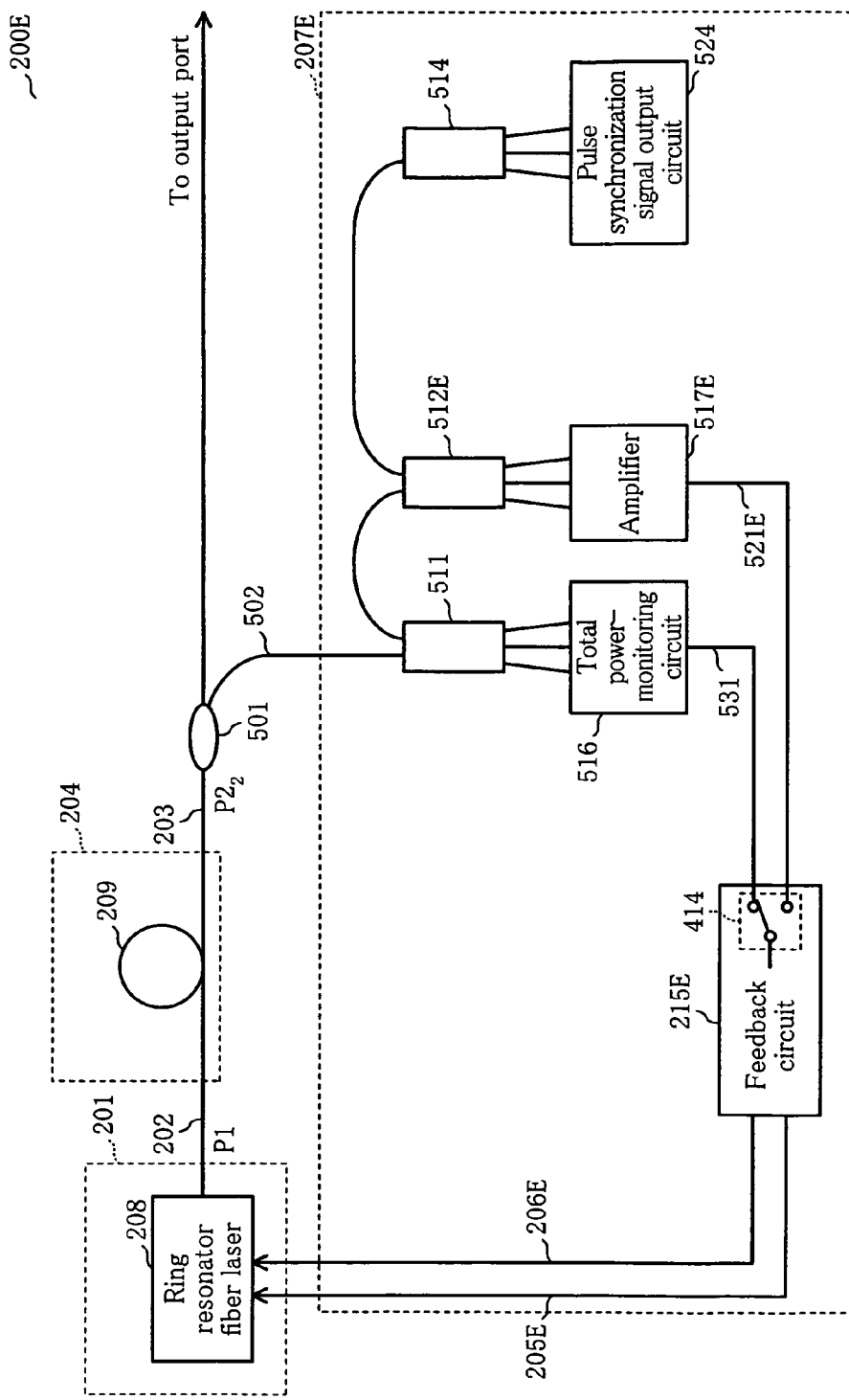
FIG. 28: the schematic block diagram showing the main part of wide bandwidth light source of the fifth example according to the present invention.

FIG. 28 shows the main part of wide bandwidth light source in the fifth example according to the present invention. The same reference numerals are attached to the same parts in FIG. 28 as those of FIG. 23 and, thus, description of these parts are omitted properly. Wide bandwidth light source 200E of the present example is constituted by optical pulse-generating device 201, white light-emitting device 204 for emitting white light 203 by inputting optical pulse 202 outputted by this optical pulse-generating device 201, optical coupler 501 for splitting white light 203 outputted by HNL (highly nonlinear) fiber 209 of white light-emitting device 204 in the proportion of 95 to 5, and operation-stabilizing circuit 207E for inputting 5 percents of white light 203 split by this optical coupler 501. The rest (95 percents) of split white light 203 is sent to the output port not illustrated.

In this wide bandwidth light source 207E, white light 502 sent from optical coupler 501 to operation-stabilizing circuit 207E is inputted to first splitting detector 511. If white light 203 inputted in optical coupler 501 is 5 μW/nm, first splitting detector 511 receives 0.25 μW/nm which is 5 percents thereof. First splitting detector 511 as well as second and fourth splitting detectors 512E and 514 is constituted by A/D (analog/digital) converting device and the splitting device. The received light is partially subjected to A/D conversion for monitoring the total power and the remained light is reflected to send to second splitting detectors 512E. Following these steps, second splitting detectors 512E subjects partially the received light to A/D conversion and reflects the remained light to send to fourth splitting detector 514.

Second splitting detectors 512E has the dielectric filter (not illustrated) of a type passing a short wavelength. Through second splitting detectors 512E, the light component having the wavelength shorter than 1180 nm in the incident light passes to subject the signal level of the passed light to A/D conversion. Other wavelength components are reflected toward fourth splitting detectors 514. Fourth splitting detectors 514 subjects the incident light to A/D conversion.

The output obtained after A/D conversion of first splitting detector 511 as described above is inputted in total power-monitoring circuit 516. Total power-monitoring circuit 516 is, as described later, used for calculating a ratio to the passed light having a specific wavelength to adjust wide bandwidth light source 200D of the present example. Therefore, Output 531 of total power-monitoring circuit 516 is inputted in the input terminal of feedback circuit 215E.

The output obtained after A/D conversion of second splitting detector 512E is inputted in amplifier 517E and amplified to input in the other input terminal of feedback circuit 215E as detection output 521E. Feedback circuit 215E has selection circuit 414 as shown in FIG. 20. By selection circuit 414 using one selected from the detection outputs, first feedback signal 205E to be fed to first automatic rotation stage 221 of ring resonator fiber laser 208, which is shown in FIG. 7, for controlling and second feedback signal 206E to be fed second automatic rotation stage 222 for controlling are outputted.

The output of fourth splitting detectors 514 after A/D conversion is outputted to pulse synchronization signal output circuit 524. Pulse synchronization signal output circuit 524 is the circuit used for maintaining synchronization of the light pulse.

With the reference to this wide bandwidth light source 200E of the fifth example, the way for adjusting the rotation angles of first λ/4 waveplate 123 and λ/2 waveplate 124 will be specifically described below.

Figure 29:
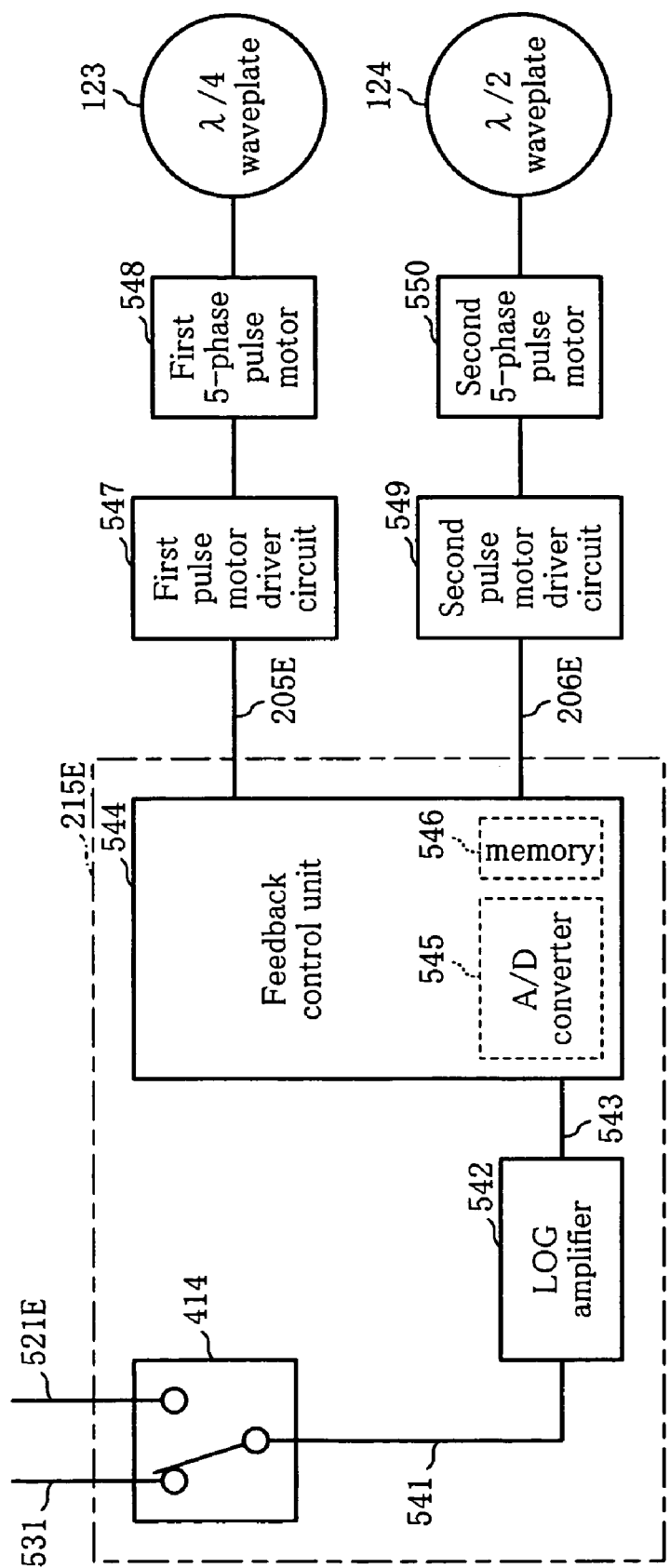
FIG. 29: block diagram showing the main part of a feedback circuit and the optical pulse-generating device in the fifth example.

FIG. 29 shows the main parts of the feedback circuit and the optical pulse-generating device. Feedback circuit 215E has selection circuit 414 constituted by an analog switch. In selection circuit 414 as shown in 28, detection outputs 521E of output 531 of total power-monitoring circuit 516 and amplifier 517E are inputted to output detection output 541. This detection output 541 is inputted to LOG (logarithmic) amplifier 542. In LOG amplifier 542, detection signal 543 is inputted in A/D converter 545 installed in feedback control unit 544. Feedback control unit 544 has CPU (central processing unit) not illustrated, control program, and memory 546, in which fixed data is stored. And, by using the detection signal as digital data after conversion by A/D converter 545, first feedback signal 205E and second feedback signal 206E are outputted.

First feedback signal 205E is inputted in first pulse motor driver circuit 547 used for first λ/4 waveplate 123 installed in optical pulse-generating device 201 shown in FIG. 23 to control the rotation of first 5-phase pulse motor 548. First 5-phase pulse motor 548 is supplied to first automatic rotation stage 221 (refer to FIG. 7) in which first λ/4 waveplate 123 is installed.

Similarly, second feedback signal 206E is inputted in second pulse motor driver circuit 549 used for λ/2 waveplate 124 installed in optical pulse-generating device 201 to control the rotation of second 5-phase pulse motor 550. Second 5-phase pulse motor 550 is supplied to second automatic rotation stage 222 (refer to FIG. 7) in which λ/2 waveplate 124 is installed.

Figure 30:
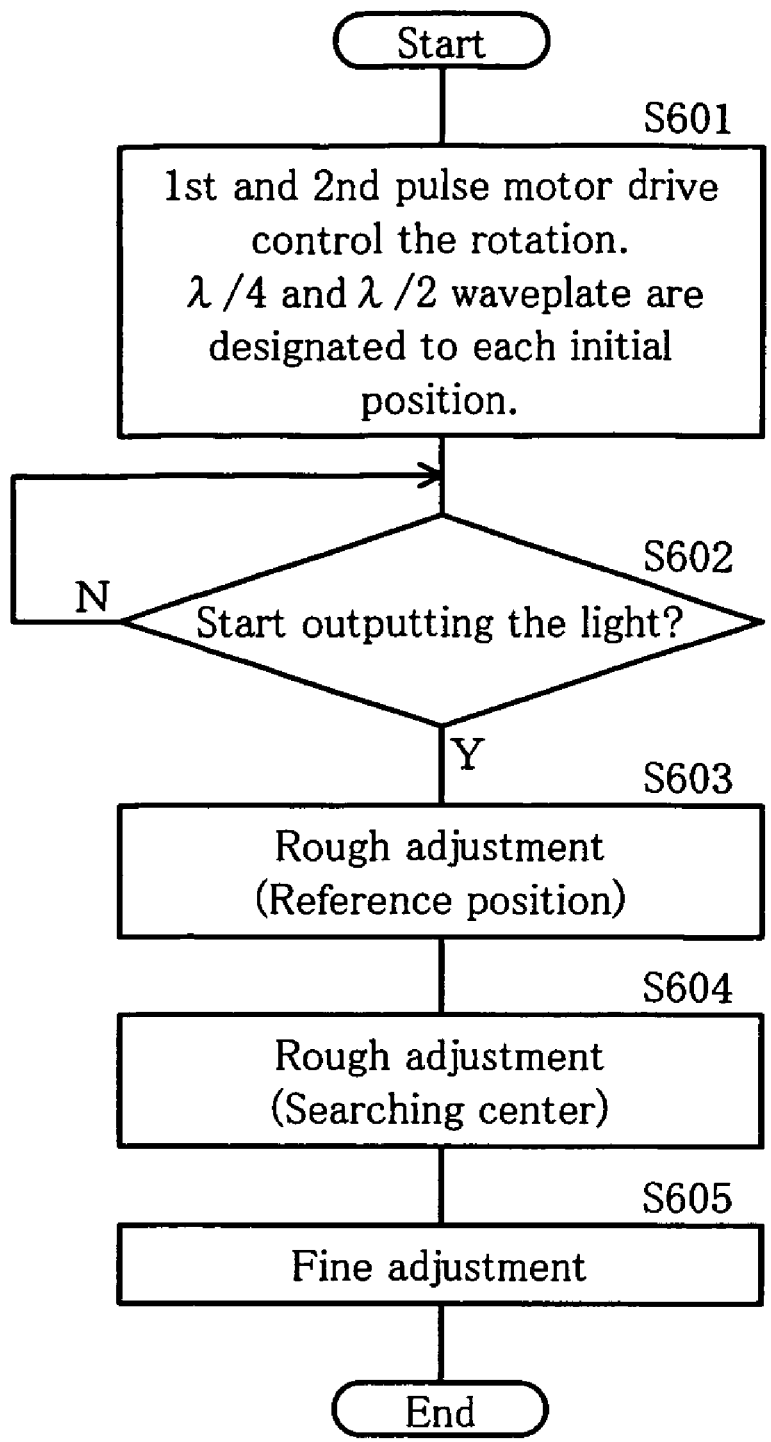
FIG. 30: a flow chart showing an outline a flow of the rotation control of the first λ/4 waveplate and the λ/2 waveplate of the wide bandwidth light source of the fifth example.

FIG. 30 shows an outline of a flow of the rotation control of first λ/4 waveplate and λ/2 waveplate of the wide bandwidth light source of the present example. Description will be made together with FIG. 28 and FIG. 29. When the power source of wide bandwidth light source 200E is turned on, feedback control unit 544 read an initial value stored in a nonvolatile memory area of memory 546 and generates first and second feedback signals 205E and 206E to output to first and second pulse motor driver circuits 547 and 549. By this step, the rotation of first and second 5-phase pulse motors 548 and 550 is controlled and first λ/4 waveplate 123 and λ/2 waveplate 124 are designated to each initial position (step S601.)

Hereafter, light source-outputting start button on an operation panel not illustrated is depressed to designate to start outputting the light from wide bandwidth light source 200E (step S602: Y,) and rough adjustment is executed for calculating a reference position of the light source (step S603.) In this rough adjustment, feedback control unit 544 read data for rough adjustment, which has been stored in the nonvolatile memory area of memory 546, control the rotation of first and second 5-phase pulse motors 548 and 550, and rotates first λ/4 waveplate 123 and λ/2 waveplate 124 in the order. Specifically, for example, the angle of first λ/4 waveplate 123 is determined to rotate λ/2 waveplate 124 in a predetermined angle range. Next, the angle of first λ/4 waveplate 123 is changed for 1 step to rotate λ/2 waveplate 124 in the predetermined angle range. Following these steps, the angle of first λ/4 waveplate 123 is gradually and repeatedly changed to rotate λ/2 waveplate 124 in the predetermined angle range. In such the way, during a process of changing a combination of angles of first λ/4 waveplate 123 and λ/2 waveplate 124, the rotation position is detected, when the level over the setting value predetermined by total power-monitoring circuit 516 is detected at the wavelength of 1180 nm. Then, the reference position is defined as the position of first λ/4 waveplate 123 and λ/2 waveplate 124.

Subsequently, "searching center" is operated as the second step of the rough adjustment for wide bandwidth light source 200E (step S604.) In the rough adjustment as the second step, with reference to the reference position determined in step S603, first λ/4 waveplate 123 and λ/2 waveplate 124 are rotated to search two positions, in which the detected level of a integrated photodetector (IPD) not illustrated, becomes the setting value or lower at 1180 nm, for each waveplate.

Figure 31:
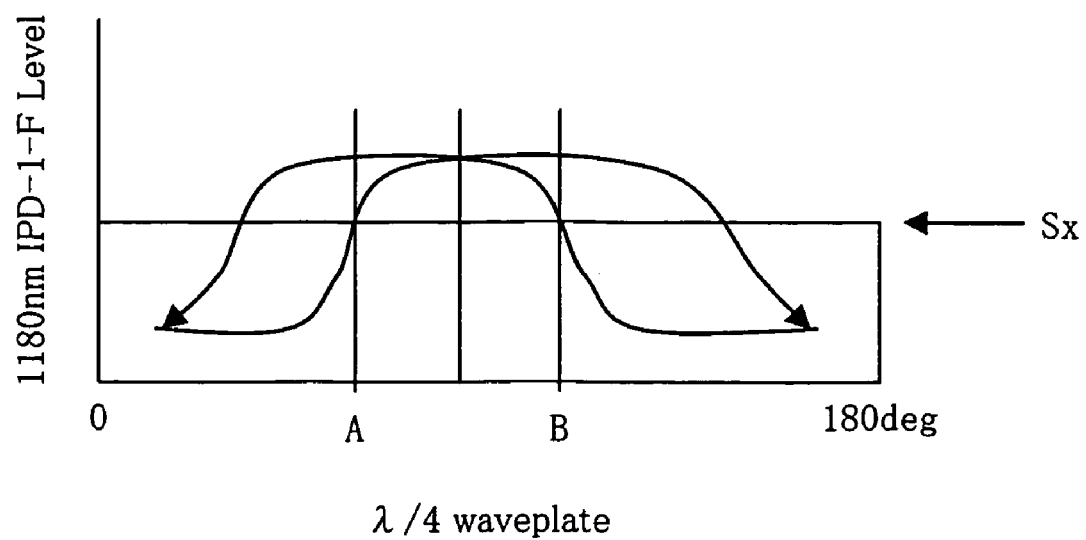
FIG. 31: a graph showing determining positions A and B in the fifth example.

FIG. 31 shows a graph for determining positions A and B in the λ/4 waveplate. The axis of abscissa represents the rotation angle of first λ/4 waveplate 123 and axis of ordinate represents the level of the integrated photodetector at 1180 nm. Characteristics of rotation of first λ/4 waveplate 123 shows hysteresis and, thus, rotation is carried out for 1 cycle. And, the positions A and B, which cross the predetermined setting position Sx, are determined. Next, an intermediate point between the positions A and B is determined. In this way, the intermediate point is also determined for λ/2 waveplate 124 not illustrated in this figure. The position, in which each of intermediate points of first λ/4 waveplate 123 and λ/2 waveplate 124 crosses, known by such the way is the point obtained by searching the center in the rough adjustment.

Following the rough adjustment as described above, a fine adjustment is operated (FIG. 25, step S605.) In this fine adjustment, the rotation of λ/2 waveplate 124 is subjected to the fine adjustment to match up the ratio of the total light amount to the light amount of 1180 nm with the setting value. As one example, the setting value is defined as 1.7.

Figure 32:
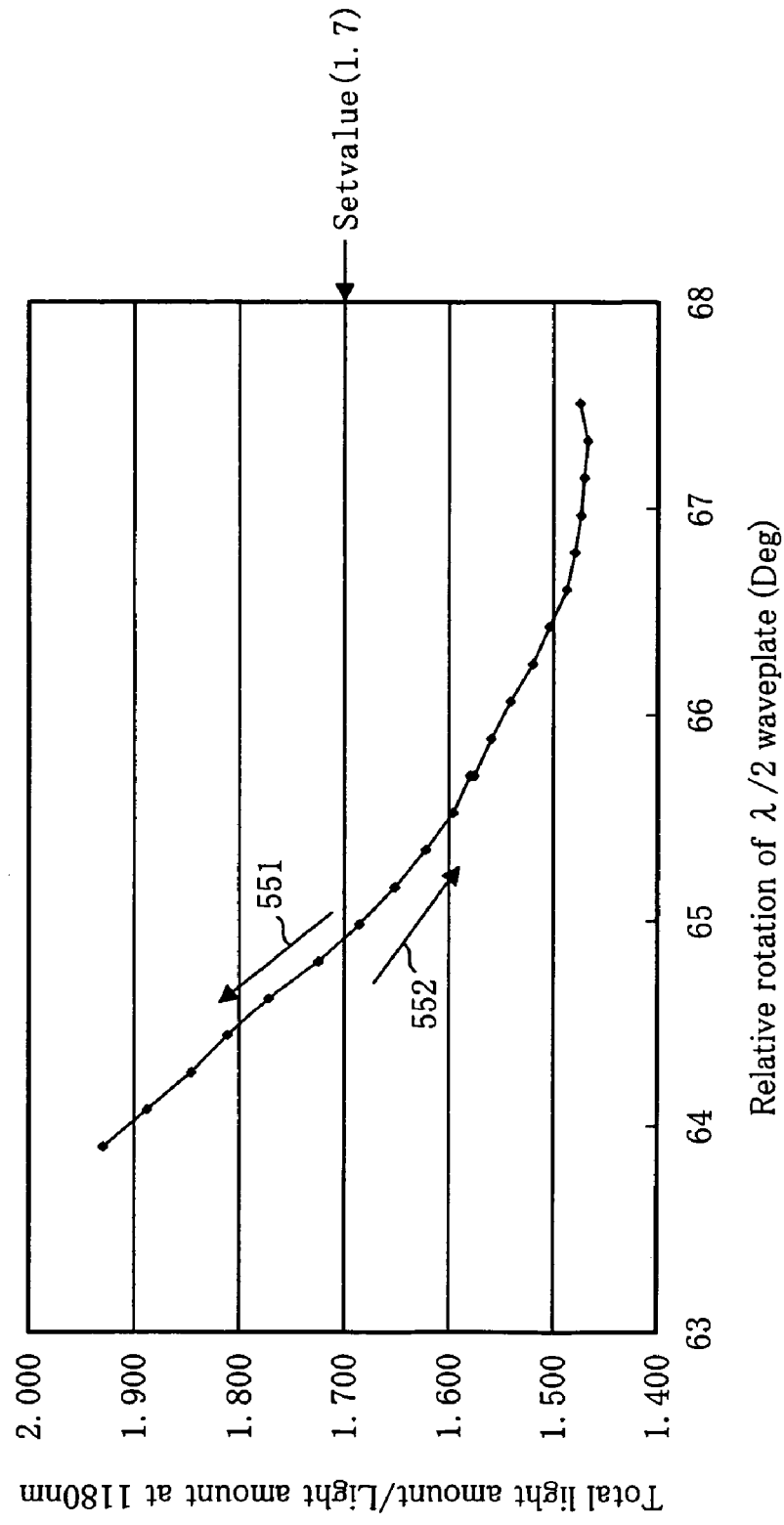
FIG. 32: the characteristic pattern showing the relation between the λ/2 waveplate and a total light amount and the amount of 1180 nm light in the fifth example.
Figure 33:
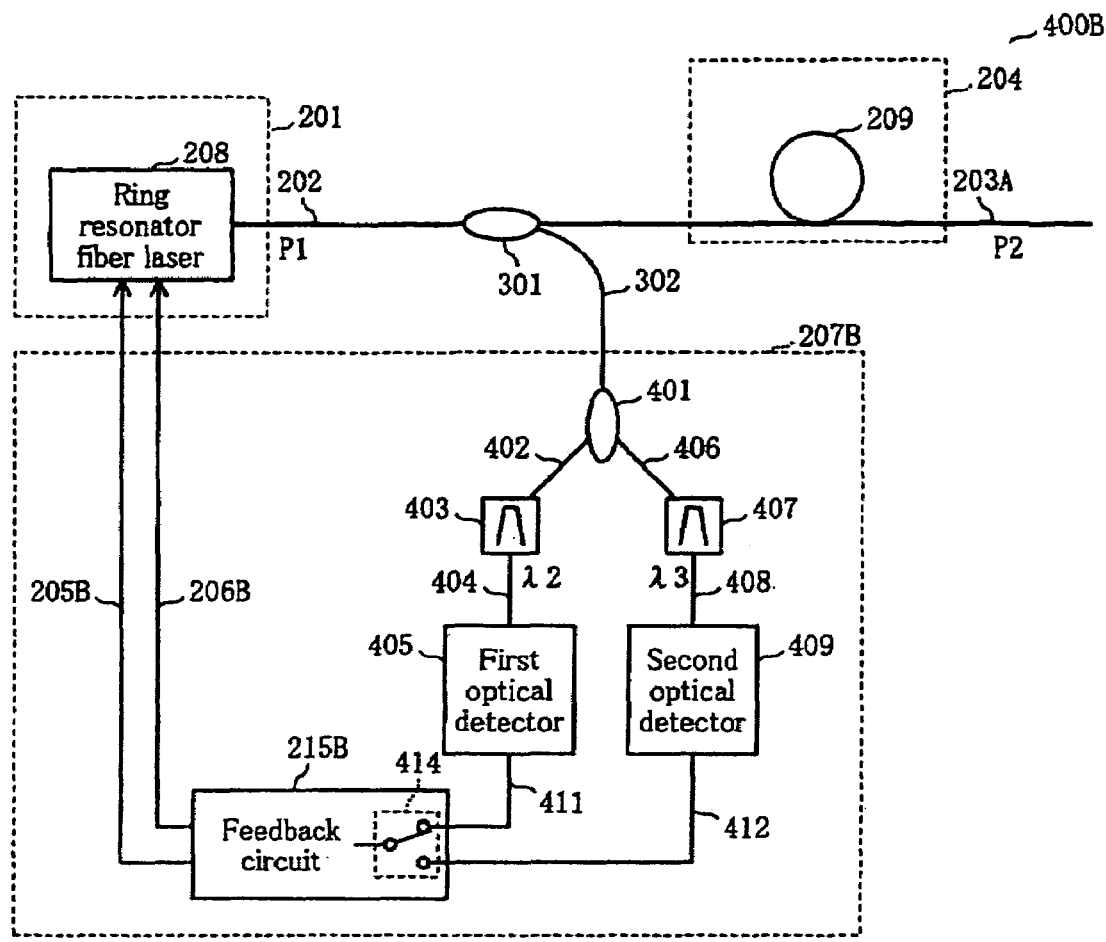
FIG. 33: the schematic block diagram of the wide bandwidth light source of another example according to the present invention.

FIG. 32 shows the principle of the fine adjustment. It is assumed that the total light amount is P1 and the light amount at 1180 nm is P2. From this figure, a relation is found between the rotation of λ/2 waveplate 124 and the ratio of the total light amount P1 to the light amount at 1180 nm P2. Hence, when this ratio increases from the set value "1.7", as shown by arrow 551, λ/2 waveplate 124 is slightly rotated in the plus direction. On the other hand, when the ratio decreases from the set value "1.7", as shown by arrow 552, λ/2 waveplate 124 is slightly rotated in the minus direction. When the ratio is matched with the set value "1.7" in this way, the fine adjustment is completed.

However, rotating λ/2 waveplate 124 in this fine adjustment causes a change of the spectrum according the rotation. Therefore, when white light 203 outputted from optical coupler 501 shown in FIG. 28 is actually used as the light source, an allowable range of the light source itself may be widely determined to omit this fine adjustment. This fine adjustment can be operated by using first λ/4 waveplate 123. However, using first λ/4 waveplate 123 causes a large change of the spectrum in comparison with λ/2 waveplate 124. Therefore, as a rule, for the fine adjustment, use of λ/2 waveplate 124 is preferable.

What is claimed is:

1. A wide bandwidth light source, comprising:
    an optical pulse-generating means for generating pulses of light comprising a predetermined waveplate and a rotation stage, on which the plate is rotatably arranged, in a light path through which the pulses of light travel;
    white light-emitting means for emitting a white light, of which spectrum distribution ranges to a wide bandwidth, by inputting pulses of light outputted from said optical pulse generating means;
    monitoring means for monitoring a light component of a predetermined wavelength yielded by splitting the pulses of light outputted by said optical pulse generating means or the white light outputted by the white light emitting means;
    operation-stabilizing means for controlling an output from said optical pulse generating means in the range, in which mode-locking is maintained, by using a result of monitoring by said monitoring means for controlling the rotation of the rotation stage.

2. The wide bandwidth light source according to claim 1, wherein said optical pulse-generating means is a laser light source by using passive mode-locking requiring no external electric modulation.

3. The wide bandwidth light source according to claim 1, wherein said monitoring means comprises an optical filter for extracting the light components of a predetermined 1 or a plurality of wavelength ranges and a photodetector, which is used for detecting intensity of these light components, installed corresponding to each of the extracted light components.

4. The wide bandwidth light source according to claim 2, wherein said optical pulse-generating means comprises a predetermined waveplate and a rotation stage, on which the plate is rotatably arranged, in a light path through which the pulses of light travel.

5. The wide bandwidth light source according to claim 2, wherein said optical pulse-generating means comprises optical power-controlling means for controlling an optical power of a pump source.

6. The wide bandwidth light source according to claim 4, wherein said operation-stabilizing means is the means, in which for a rotation angle of the rotation table an upper limit value and a lower limit value are previously specified to maintain mode-locking, for controlling the rotation of the rotation stage in the range between these values.

7. The wide bandwidth light source according to claim 2, wherein said optical pulse-generating means comprises an optical fiber for propagation of the pulses of light and vibration-generating means for vibrating at least partially the optical fiber for a predetermined time at the time of start and recovery of mode-locking by said passive mode-locking.

8. A wide bandwidth light source comprising:
    an optical pulse-generating means comprising a ring resonator fiber laser, having a λ/4 waveplate and a λ/2 waveplate in a light path thereof, and outputting after splitting the optical pulses, that is passed through these 2 waveplates, by using a polarizing beam splitter;
    a rotation stage on which each of said λ/4 waveplate and said λ/2 waveplate are individually rotatably arranged;

splitting means for splitting light of the optical pulses, that is outputted by said optical pulse-generating means, in a predetermined proportion;

a filter for selecting the light components of a specific wavelength by inputting the light split by said splitting means;

photoelectric converting means for converting the light components of said specific wavelength, that is selected by said filter, to an electric signal; and an operation-stabilizing means for feeding the electric signal outputted by said photoelectric converting means to said rotation stage as a feedback signal in order to control the rotation angle for operation of output control of said optical pulse-generating means in the range, in which mode-locking is maintained.

9. A wide bandwidth light source comprising:

an optical pulse-generating means comprising a ring resonator fiber laser, having a $\lambda/4$ waveplate and a $\lambda/2$ waveplate in a light path thereof, and outputting after splitting the optical pulses, that is passed through said 2 waveplates, by using a polarizing beam splitter;

a rotation stage on which each of said $\lambda/4$ waveplate and said $\lambda/2$ waveplate are individually rotatably arranged;

white light-emitting means for emitting white light, of which spectrum distribution extends to the wide bandwidth, by inputting the optical pulses outputted by said optical pulse-generating means;

splitting means for splitting light of white light, that is outputted by said white light-emitting means as a light source, in a predetermined proportion;

a filter for selecting the light components of a specific wavelength by inputting the light split by said splitting means;

photoelectric converting means for converting the light components of said specific wavelength, that is selected by said filter, to an electric signal; and an operation-stabilizing means for feeding the electric signal outputted by said photoelectric converting means to said rotation stage as a feedback signal in order to control the rotation angle for operation of output control of said optical pulse-generating means in the range, in which mode-locking is maintained.

10. A wide bandwidth light source comprising:

an optical pulse-generating means comprising a ring resonator fiber laser, having a $\lambda/4$ waveplate and a $\lambda/2$ waveplate in a light path thereof, and outputting after splitting the optical pulses, that is passed through said 2 waveplates, by using a polarizing beam splitter;

a rotation stage on which each of said $\lambda/4$ waveplate and said $\lambda/2$ waveplate are individually rotatably arranged;

splitting means for splitting light of the optical pulses, that is outputted by said optical pulse-generating means, in a predetermined proportion;

a first filter for passing light components of a first wavelength and reflecting other wavelength components by inputting the light split by said splitting means;

a first photoelectric converting means for converting the light components of the first wavelength, that is passed through said first filter, to the electric signal;

a second filter for passing light components of a second wavelength, that is different form the first wavelength, and reflecting other wavelength components by inputting the light components reflected by said first filter;

a second photoelectric converting means for converting the light components of the second wavelength, that is passed through said second filter, to the electric signal;

a selection circuit for selecting any one of electric signals outputted by said first and second photoelectric converting means; and an operation-stabilizing means for feeding the electric signal outputted by this selection circuit to said rotation stage as a feedback signal in order to control the rotation angle for operation of output control of said optical pulse-generating means in the range, in which mode-locking is maintained.

11. A wide bandwidth light source comprising:

an optical pulse-generating means comprising a ring resonator fiber laser, having a $\lambda/4$ waveplate and a $\lambda/2$ waveplate in a light path thereof, and outputting after splitting the optical pulses, that is passed through said 2 waveplates, by using a polarizing beam splitter;

a rotation stage on which each of said $\lambda/4$ waveplate and said $\lambda/2$ waveplate are individually rotatably arranged;

white light-emitting means for emitting white light, of which spectrum distribution extends to the wide bandwidth, by inputting the optical pulses outputted by said optical pulse-generating means;

splitting means for splitting light of white light, that is outputted by the white light-emitting means as a light source, in a predetermined proportion;

a first filter for passing the light components of a first wavelength and reflecting other light components by inputting the white light split by said splitting means;

a first photoelectric converting means for converting the light components of the first wavelength, that is passed through said first filter, to the electric signal;

a second filter for passing light components of a second wavelength, that is different form the first wavelength, and reflecting other wavelength components by inputting the light components reflected by said first filter;

a second photoelectric converting means for converting the light components of the second wavelength, that is passed through said second filter, to the electric signal;

a selection circuit for selecting any one of electric signals outpuited by said first and the second photoelectric converting means; and an operation-stabilizing means for feeding the electric signal outputted by said selection circuit to said rotation stage as a feedback signal in order to control the rotation angle for operation of output control of said optical pulse-generating means in the range, in which mode-locking is maintained.

12. The wide bandwidth light source according to claim 8, comprising:

power-detecting means, that is arranged between said splitting means and said filter, for measuring an amount of the light split by said splitting means to detect a power of the light outputted by said optical pulse-generating means;

reference position-setting means for changing a combination of rotation positions of said $\lambda/4$ waveplate and said $\lambda/2$ waveplate to use the combination of rotation positions, in which the power of the light outputted by the optical pulse-generating means as a light source exceeds a predetermined setting value, as a reference position on the basis of the result of detection by said power-detecting means;

center-setting means for rotating each of said $\lambda/4$ waveplate and said $\lambda/2$ waveplate, calculating positions of each of 2 positions, in which the power for a specific wavelength becomes a predetermined or less level, and assigning a neutral point of these positions to the rotation position of these $\lambda/4$ waveplate and $\lambda/2$ waveplate, using a reference position defined by the reference position-setting means as the reference.

13. The wide bandwidth light source according to claim 10, comprising:
  power-detecting means, that is arranged between said splitting means and said first filter, for measuring an amount of the light split by said splitting means to detect a power of the light outputted by said optical pulse-generating means;
  reference position-setting means for changing a combination of rotation positions of said $\lambda/4$ waveplate and said $\lambda/2$ waveplate to use the combination of rotation positions, in which the power of the light outputted by the optical pulse-generating means as a light source exceeds a predetermined setting value, as the reference position on the basis of the result of detection by said power-detecting means;
  center-setting means for rotating each of said $\lambda/4$ waveplate and said $\lambda/2$ waveplate, calculating positions of each of 2 positions, in which the power for the specific wavelength becomes a predetermined or less level, and assigning a neutral point of these positions to the rotation position of these $\lambda/4$ waveplate and $\lambda/2$ waveplate, using said reference position defined by the reference position-setting means as the reference.

14. The wide bandwidth light source according to claim 9, comprising:
  power-detecting means, that is arranged between said splitting means and said filter, for measuring an amount of the light split by said splitting means to detect the power of the white light outputted by said white light-emitting means;
  reference position-setting means for changing a combination of rotation positions of said $\lambda/4$ waveplate and said $\lambda/2$ waveplate to use the combination of rotation positions, in which the power of the light outputted by the optical pulse-generating means as a light source exceeds a predetermined setting value, as a reference position on the basis of the result of detection by said power-detecting means;
  center-setting means for rotating each of said $\lambda/4$ waveplate and said $\lambda/2$ waveplate, calculating positions of each of 2 positions, in which the power for a specific wavelength becomes a predetermined or less level, and assigning a neutral point of these positions to the rotation position of these $\lambda/4$ waveplate and $\lambda/2$ waveplate, using a reference position defined by said reference position-setting means as the reference.

15. The wide bandwidth light source according to claim 11, comprising:
  power-detecting means, that is arranged between said splitting means and said first filter, for measuring an amount of the light split by the splitting means to detect the power of the white light outputted by said white light-emitting means;
  reference position-setting means for changing a combination of rotation positions of said $\lambda/4$ waveplate and said $\lambda/2$ waveplate to use the combination of rotation positions, in which the power of the light outputted by the optical pulse-generating means as a light source exceeds a predetermined setting value, as a reference position on the basis of the result of detection by said power-detecting means;
  center-setting means for rotating each of said $\lambda/4$ waveplate and said $\lambda/2$ waveplate, calculating positions of each of 2 positions, in which the power for a specific wavelength becomes a predetermined or less level, and assigning a neutral point of these positions to the rotation position of these $\lambda/4$ waveplate and $\lambda/2$ waveplate, using a reference position defined by said reference position-setting means as the reference.

16. The wide bandwidth light source according to any one of claims 8-11, wherein said predetermined proportion of the light, that is split by said splitting means, ranges from 5 percents to 10 percents.

17. The wide bandwidth light source according to claim 9 or claim 11, wherein said white light-emitting means is composed of a highly nonlinear fiber.

18. The wide bandwidth light source according to any one of claims 8-11, comprising asynchronization state-detecting means for detecting a state, in which said mode-locking is not operated, and vibration applying means for applying vibration to a single mode optical fiber, that composes said ring resonator fiber laser, for a predetermined time, when said asynchronization state-detecting means detects the state, in which said mode-locking is not operated.

19. The wide bandwidth light source according to claim 18, wherein said vibration applying means is a piezoelectric vibrator.

20. The wide bandwidth light source according to claim 17, wherein the highly nonlinear fiber means is composed of a Ge(germanium) doped Silica based optical fiber or a photonic crystal fiber.

* * * * *